Sept. 5, 1933.  J. T. HUME  1,925,662
WASHING MACHINE
Filed July 30, 1928  17 Sheets-Sheet 4
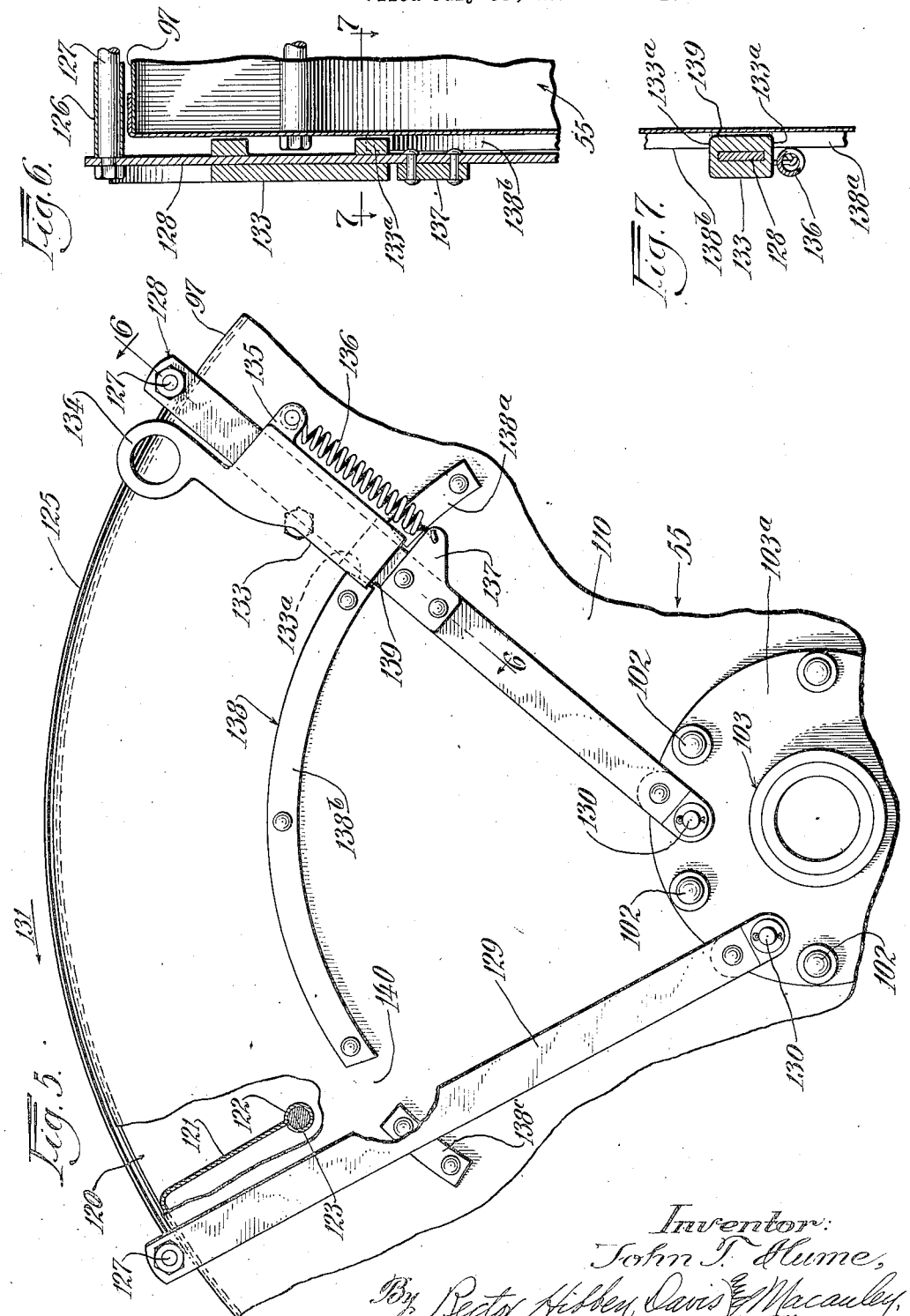

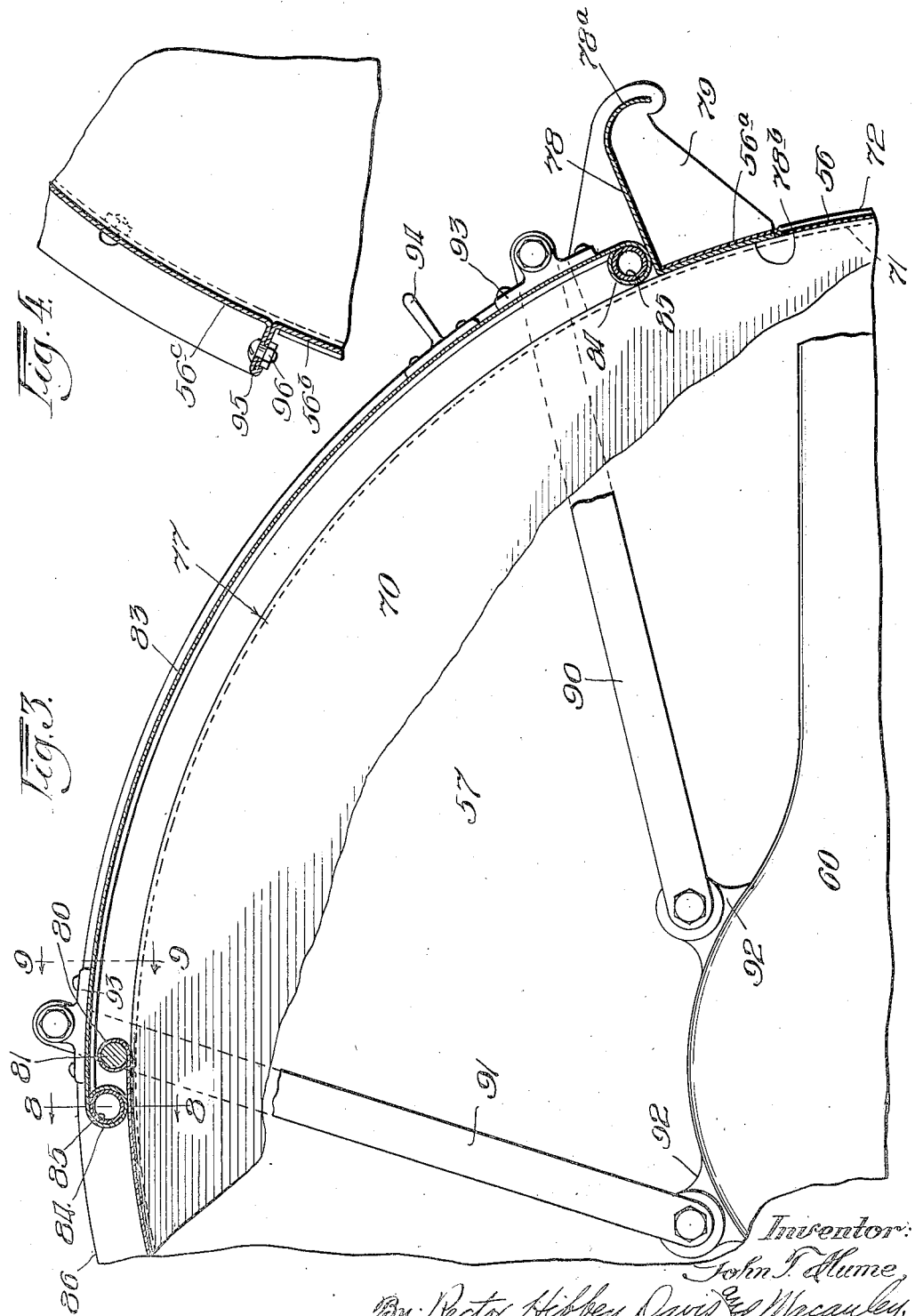

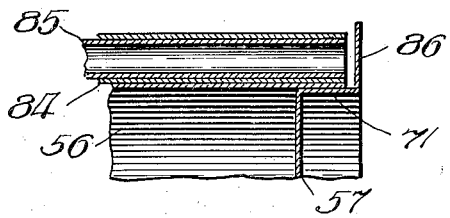
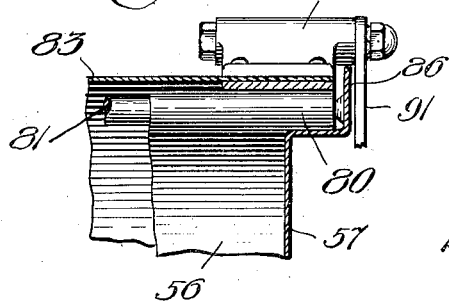
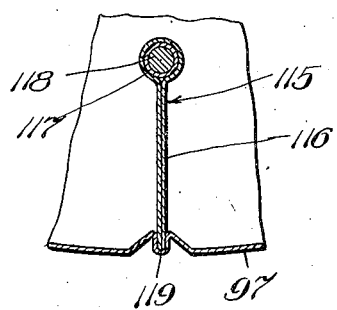
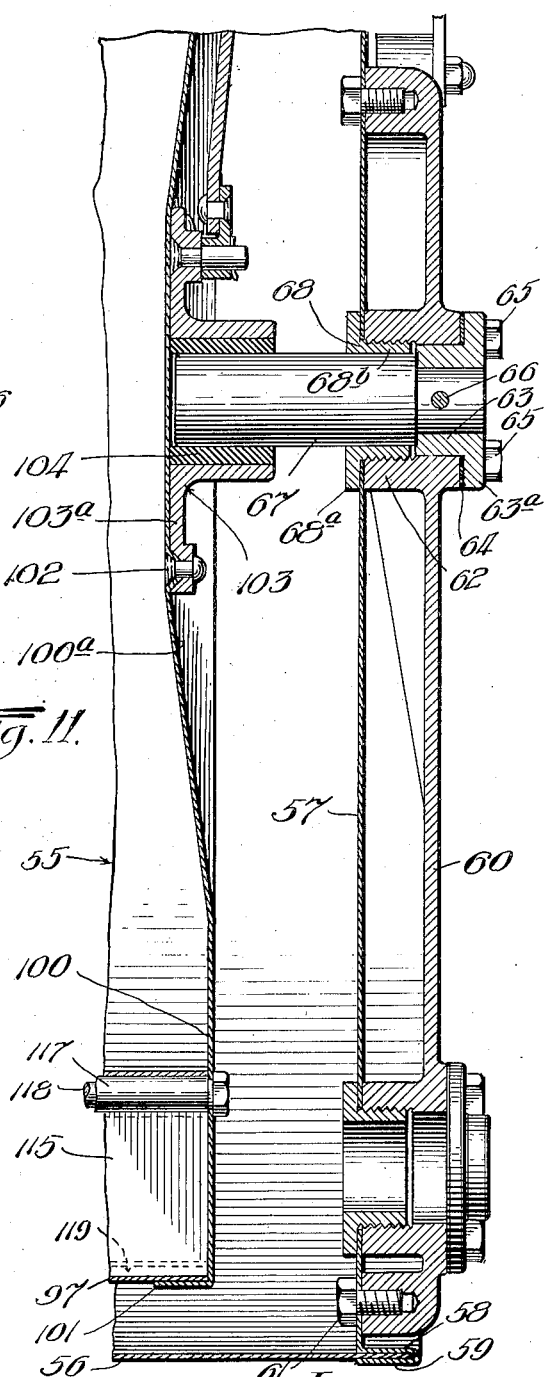

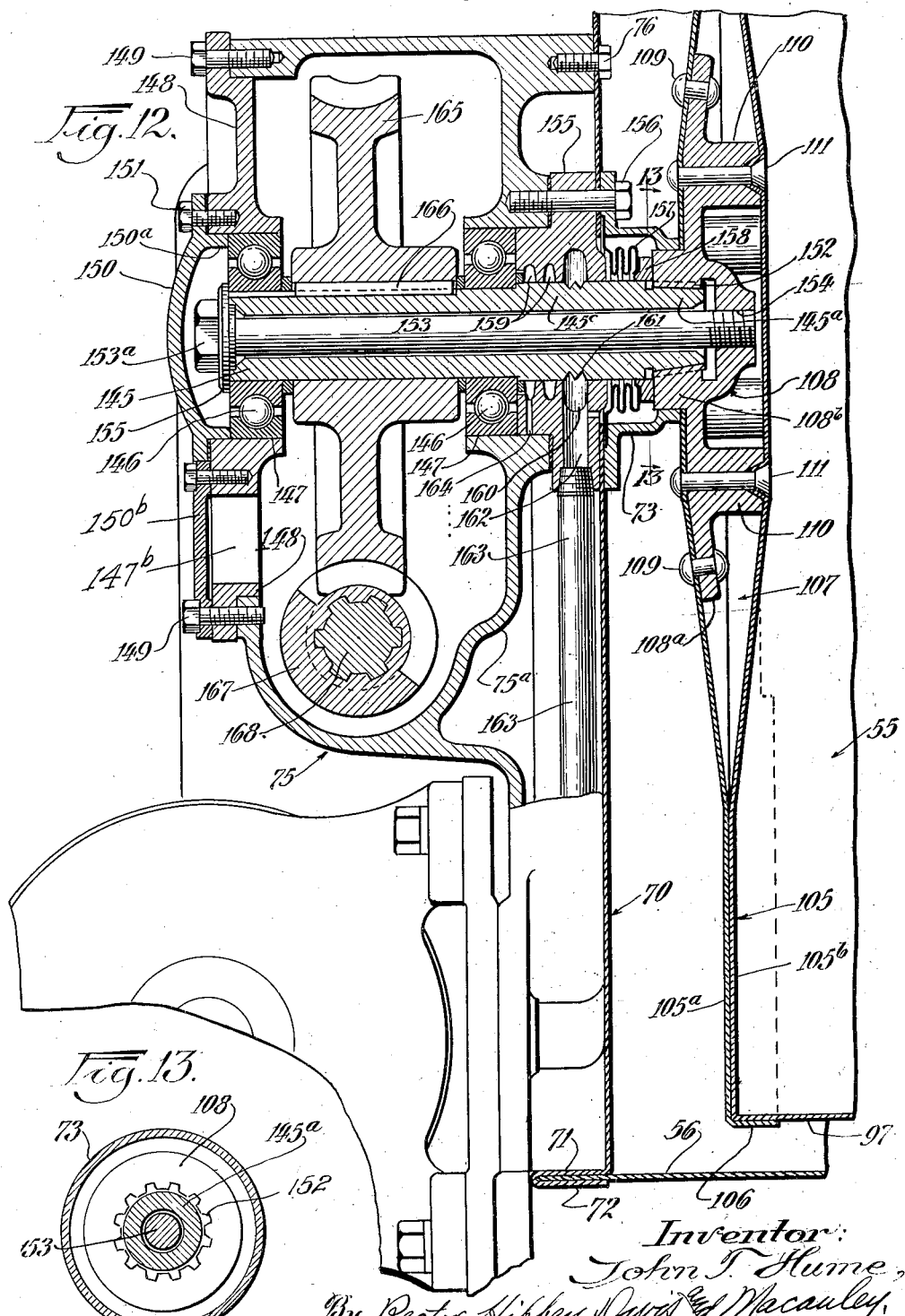

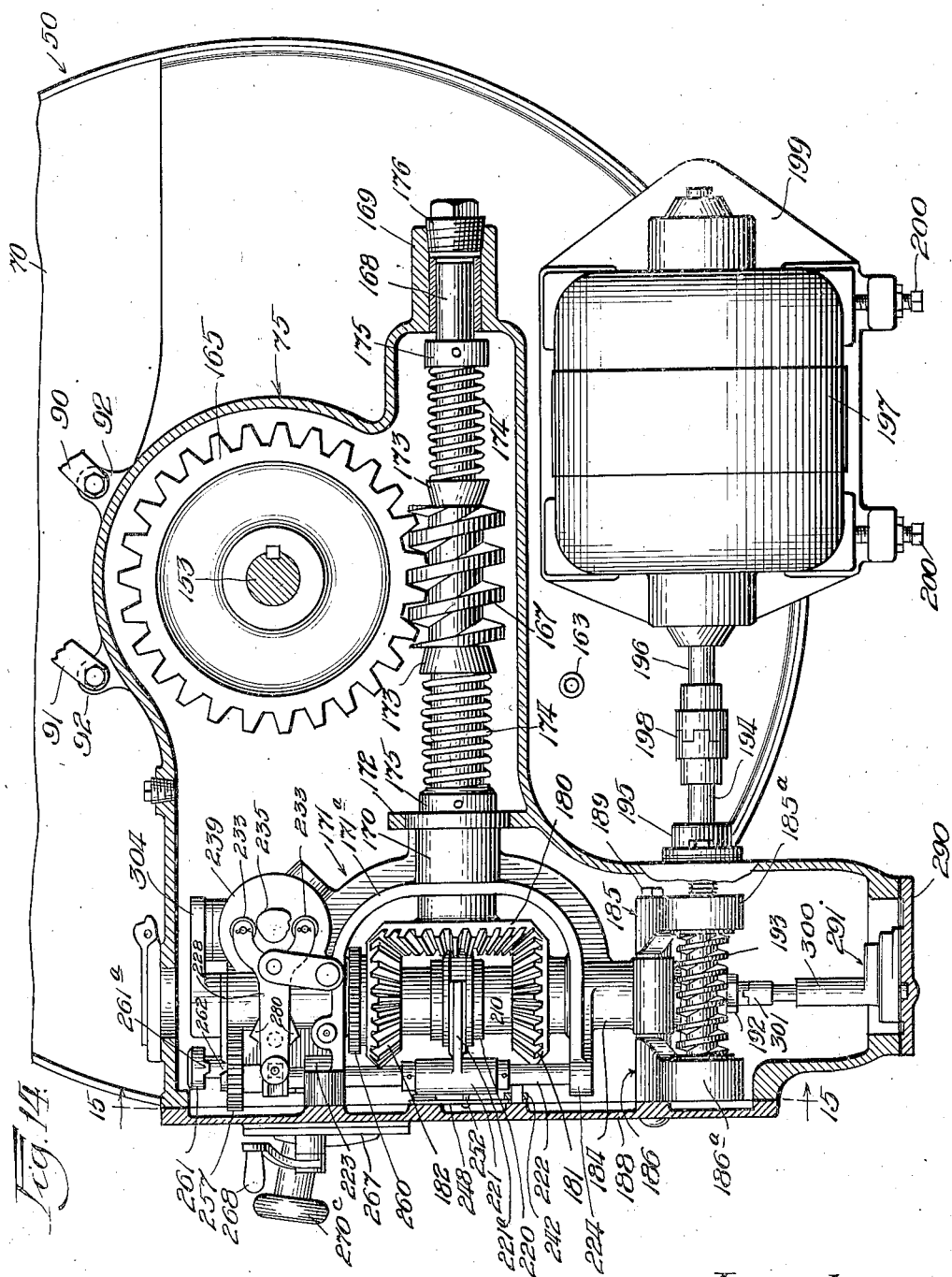

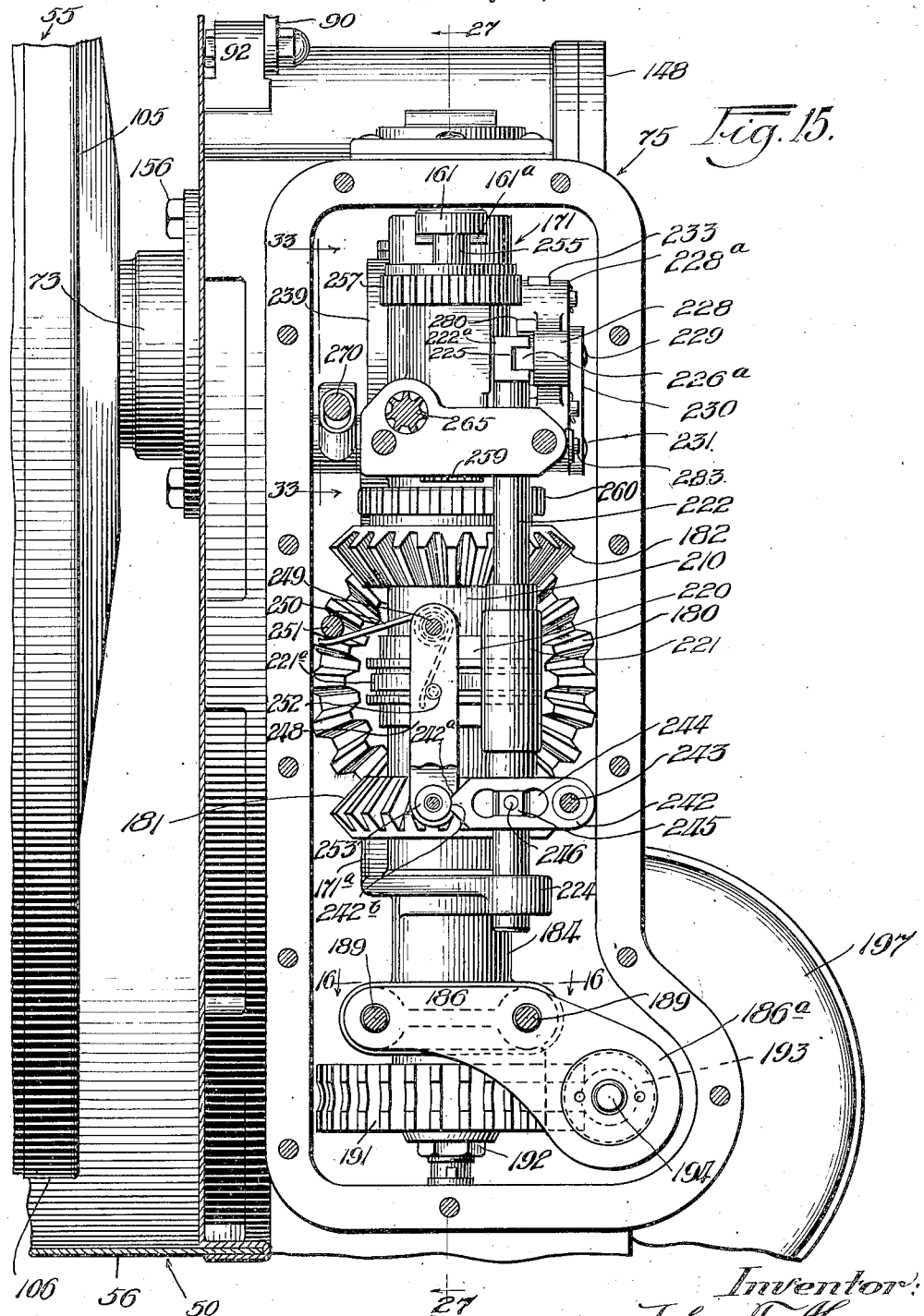

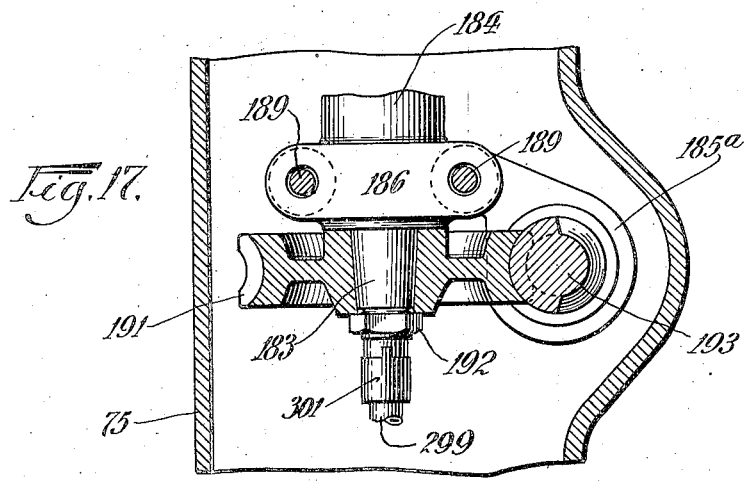
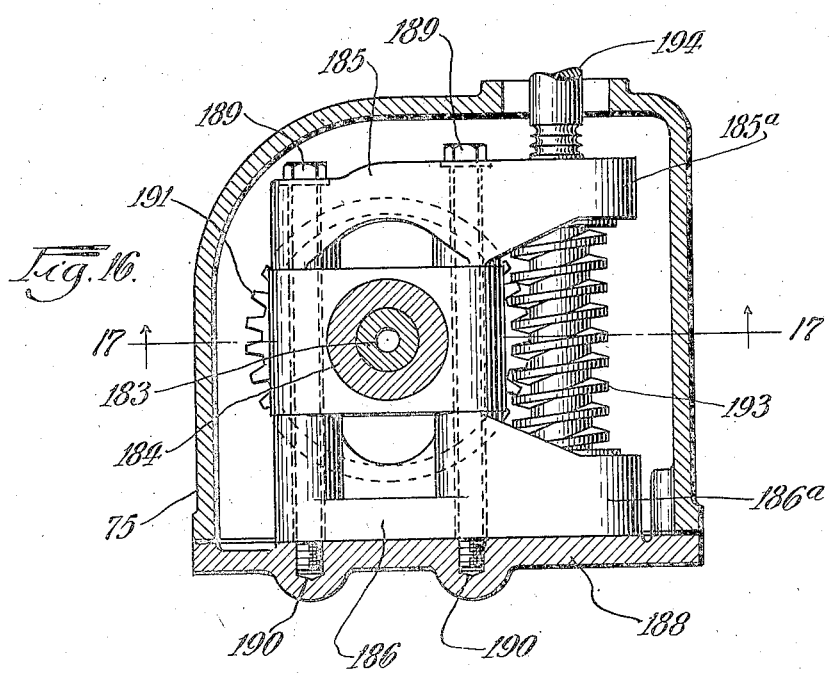

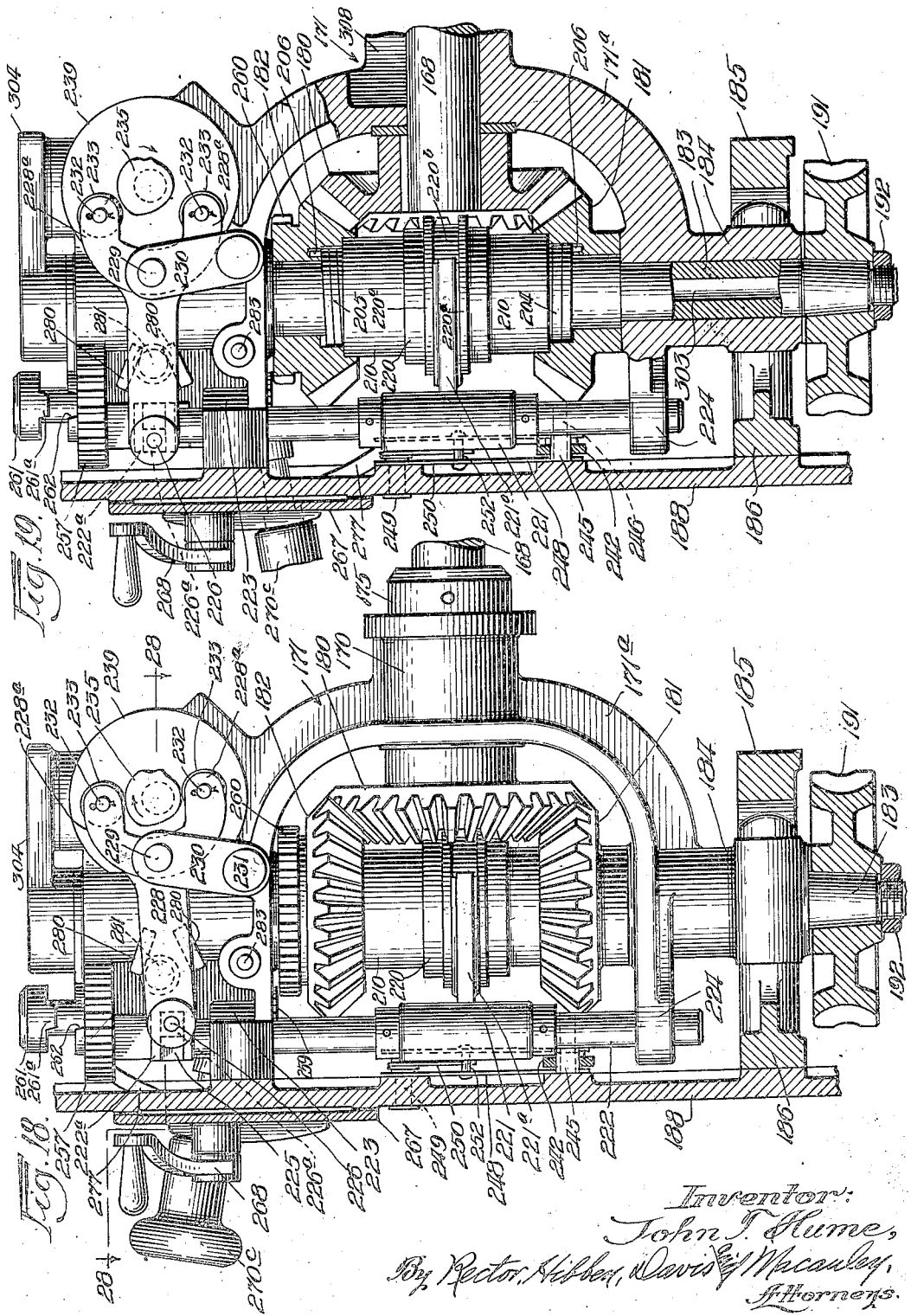

Sept. 5, 1933. J. T. HUME 1,925,662
WASHING MACHINE
Filed July 30, 1928 17 Sheets-Sheet 11
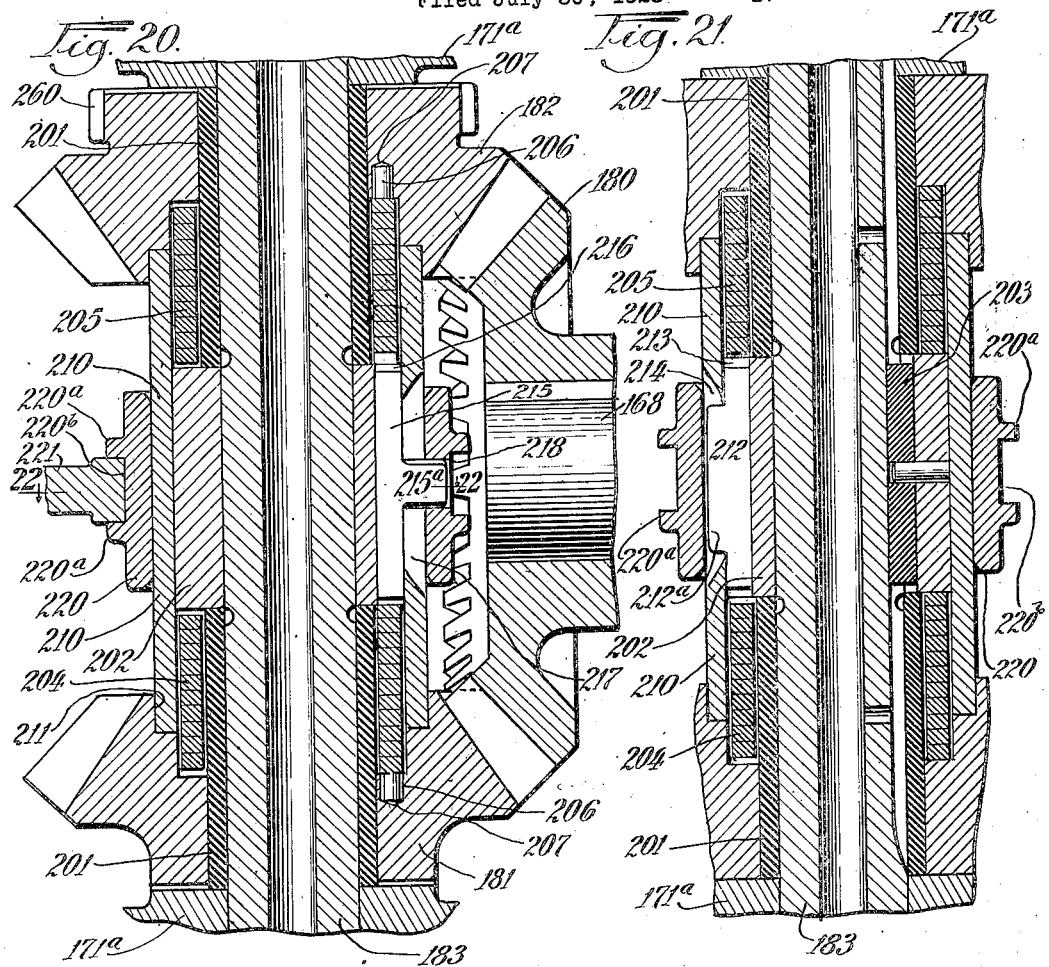
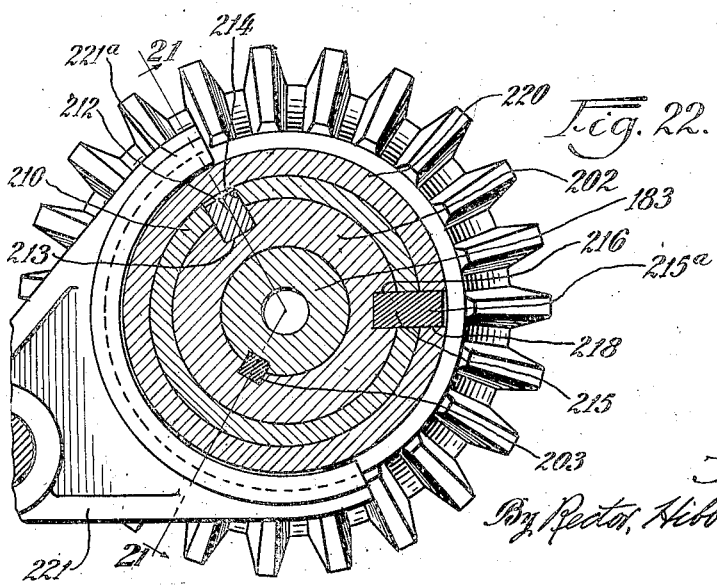
Inventor:
John T. Hume,
By Rector, Hibben, David & Macauley,
Attorneys.

Sept. 5, 1933.  J. T. HUME  1,925,662
WASHING MACHINE
Filed July 30, 1928   17 Sheets-Sheet 12

Inventor:
John T. Hume,
By Rector, Hibben, Davis & Macauley,
Attorneys.

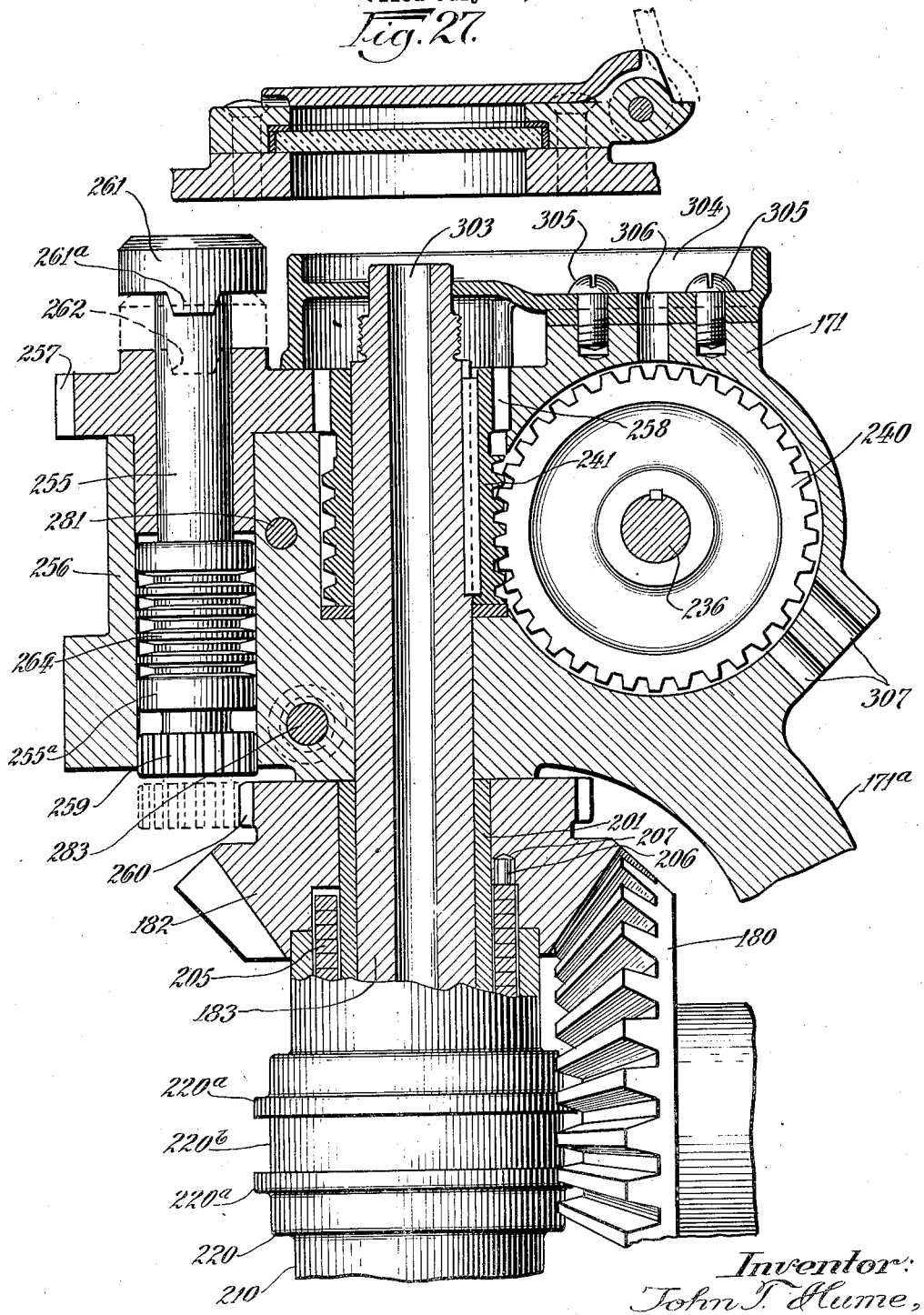

Sept. 5, 1933. J. T. HUME 1,925,662
WASHING MACHINE
Filed July 30, 1928 17 Sheets-Sheet 14
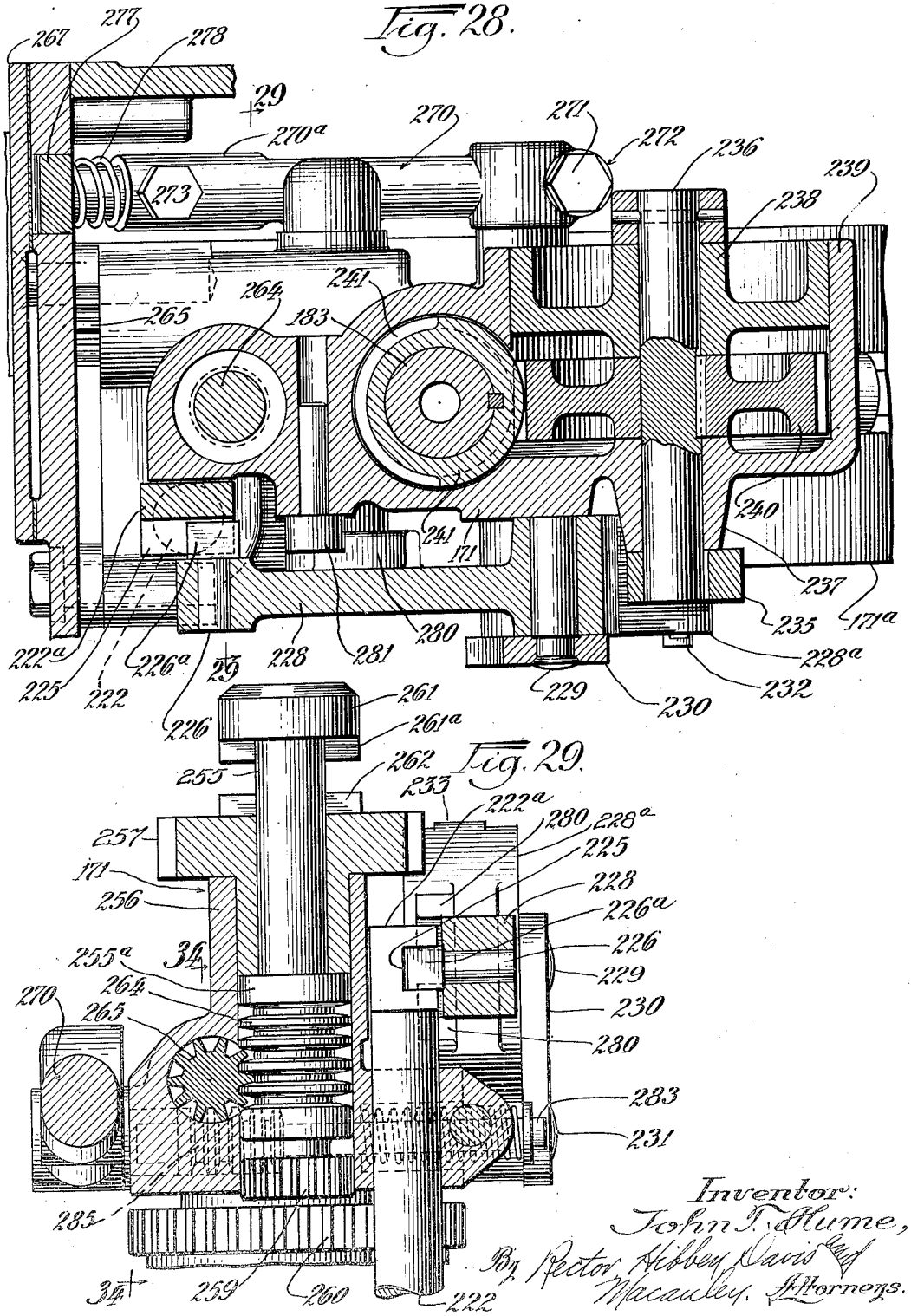

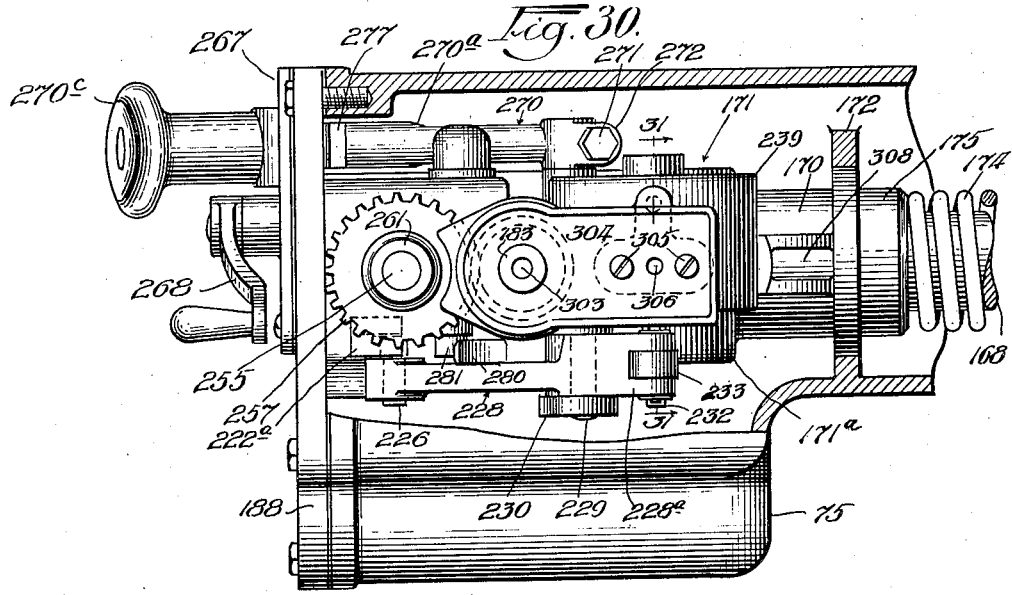

Inventor:
John T. Hume,
By Rector, Hibben, Davis & Macauley,
Attorneys.

Sept. 5, 1933.  J. T. HUME  1,925,662
WASHING MACHINE
Filed July 30, 1928   17 Sheets-Sheet 17
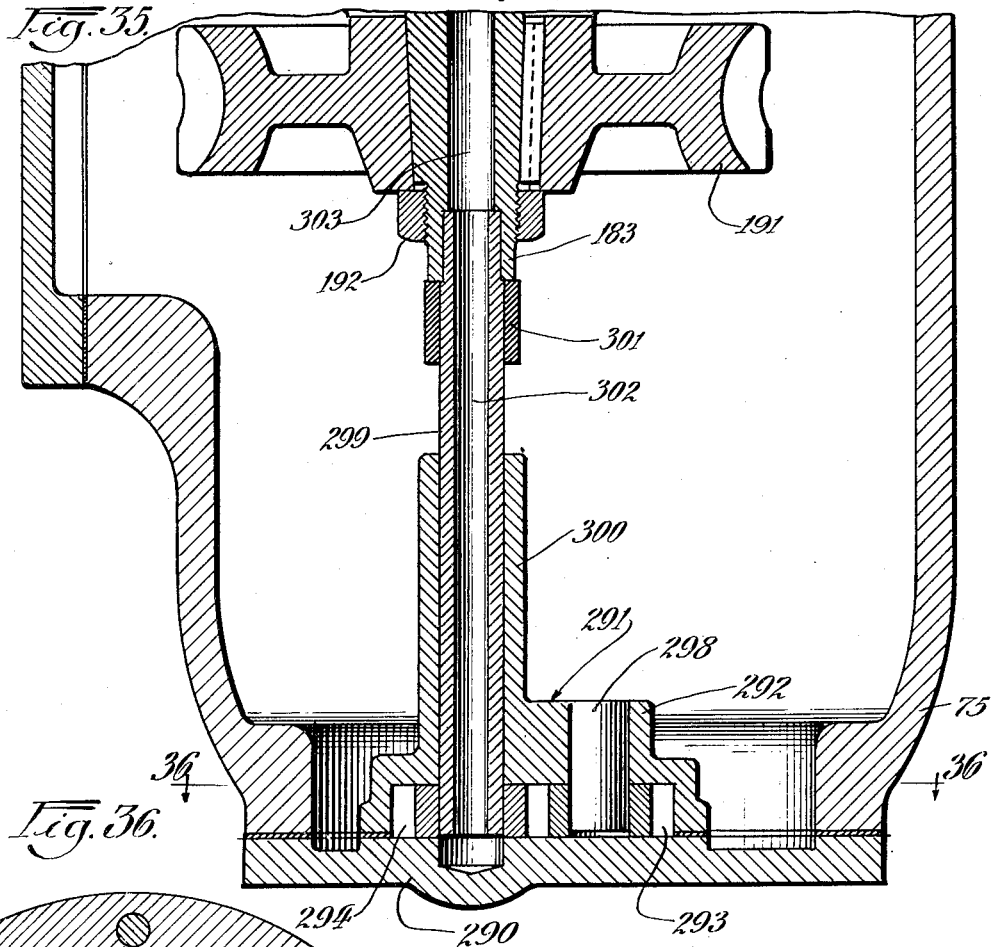
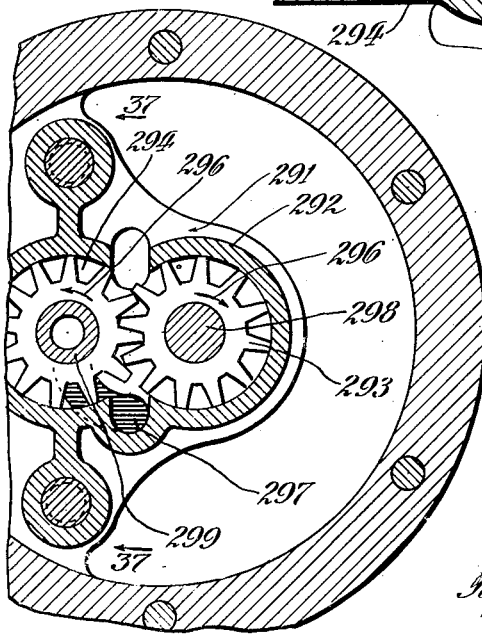
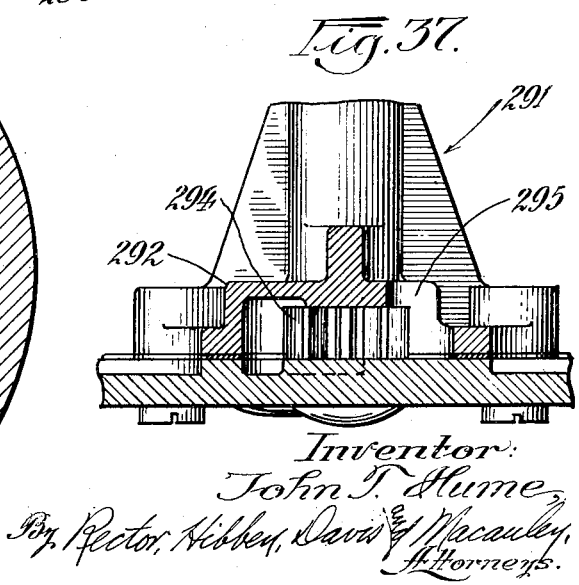
Inventor:
John T. Hume
By Rector, Hibben, Davis & Macauley,
Attorneys.

Patented Sept. 5, 1933

1,925,662

UNITED STATES PATENT OFFICE 1,925,662

WASHING MACHINE

John T. Hume, Chicago, Ill., assignor to Electric Household Utilities Corporation, Chicago, Ill., a corporation of Illinois Application July 30, 1928. Serial No. 296,231

20 Claims. (Cl. 68—18)

This invention relates to improvements in washing machines and its purpose is to provide an improved power driven machine adapted particularly for use in commercial laundries, although the invention might be embodied in a small machine for domestic use. The principal object of the invention is to provide a clothes washing machine of the double cylinder type having improved means for rotating the inner clothes-containing cylinder and reversing the direction thereof at predetermined intervals. A further object of the invention is to provide a power driven machine having improved actuating mechanism for rotating the cylinder and reversing the direction of rotation thereof without shock to the driving mechanism during the periods of reversal. A further object of the invention is to provide a power driven washing machine comprising an outer cylinder and an inner cylinder each having a clothes-receiving opening therein with means for rotating the inner cylinder and auxiliary means for bringing the openings of the two cylinders into alignment in the event that they are out of alignment when the normal operation of the machine is stopped. A further object of the invention is to provide a washing machine having actuating mechanism for actuating the clothes-containing vessel in combination with auxiliary means for effecting a slow movement of said vessel to bring its clothes-receiving opening into a desired position, and means for preventing the operation of said mechanism during the actuation of said auxiliary means. Still another object of the invention is to provide improved driving mechanism for actuating the clothes-containing vessel and reversing the direction of movement thereof in combination with means embodied in the reversing mechanism for absorbing the shock during the periods of reversal. A further object of the invention is to provide improved means for automatically lubricating the driving mechanism of the washing machine. A still further object is to provide an improved cover construction for closing the openings of the outer and inner vessels of the washing machine. Other objects relate to various features of construction and arrangement which will appear more fully hereinafter.

The nature of the invention will be understood from the following specification taken with the accompanying drawings in which one embodiment is illustrated. In the drawings, Figure 1 shows a side elevation of a washing machine embodying the features of the present invention;

Fig. 3 shows a partial transverse section through the outer cylinder of the washing machine taken on the line 3—3 of Fig. 1;

Fig. 4 is a partial sectional view through another portion of the outer cylinder of the washing machine showing the stop for limiting the opening movement of the cylinder cover;

Fig. 5 shows a partial end elevation of the inner clothes-containing cylinder, with a part thereof in section, illustrating the mounting of the cover which is adapted to close the opening through which clothes are inserted into and withdrawn from the cylinder;

Fig. 6 is a detail section taken on the line 6—6 of Fig. 5;

Fig. 7 is a detail section taken on the line 7—7 of Fig. 6;

Fig. 8 is a detail sectional view taken on the line 8—8 of Fig. 3 showing the construction at one edge of the cover of the outer cylinder;

Fig. 9 is a detail section taken on the line 9—9 of Fig. 3;

Fig. 10 is a partial section taken transversely through the inner cylinders showing a section of one of the clothes lifting or agitating blades;

Fig. 11 is a longitudinal vertical section taken through the axes of the cylinders of the washing machine illustrated in Fig. 1 showing the construction at the left-hand end of the cylinder as viewed in Fig. 1;

Fig. 12 is a vertical section through the axes of the cylinders of the washing machine showing the construction of the parts, including a portion of the driving mechanism, at the right-hand end of the machine as viewed in Fig. 1;

Fig. 13 is a sectional view taken on the line 13—13 of Fig. 12, illustrating the means of forming a driving connection with the inner rotatable cylinder;

Fig. 14 shows a sectional view taken transversely of the machine through the casing of the driving mechanism, showing the said mechanism in end elevation;

Fig. 15 is a sectional view taken on the line 15—15 of Fig. 14, showing an elevation of the driving mechanism from the side of the machine with the cover of the casing removed;

Fig. 16 is a sectional view taken on the line 16—16 of Fig. 15;

Fig. 17 is a sectional view taken on the line 17—17 of Fig. 16;

Fig. 18 is a longitudinal view through the casing of the driving mechanism showing an enlarged side elevation of a portion of the driving and reversing mechanism;

Fig. 19 is a view similar to that of Fig. 18 with the driving and reversing gears shown in section and with the parts adjusted to render the automatic reversing mechanism inoperative;

Fig. 20 shows a vertical section through the driving and reversing gears illustrated in Fig. 18;

Fig. 21 is a section taken on the line 21—21 of Fig. 22;

Fig. 22 is a horizontal section taken on the line 22—22 of Fig. 20;

Fig. 27 is a sectional view taken on the line 27—27 of Fig. 15 showing the mechanism by which a slow actuation of the inner rotatable cylinder may be effected by bringing the openings of the two cylinders into alignment;

Fig. 28 is a sectional view taken on the line 28—28 of Fig. 18;

Fig. 29 is a sectional view taken on the line 29—29 of Fig. 28;

Fig. 30 shows a top plan view of the casing of the driving mechanism with a portion of the casing broken away to disclose a top plan view of a portion of the reversing and feeding means;

Fig. 31 is a detail section taken on the line 31—31 of Fig. 30;

Fig. 32 shows an end elevation of the portion of the casing illustrated in Fig. 30 looking toward the right as viewed in Fig. 30;

Fig. 35 is a vertical section taken through the axis of the shaft of the oil feeding pump mounted in the lower casing of the driving mechanism showing the connection of the pump shaft with the main driving shaft;

Fig. 36 is a detail section taken on the line 36—36 of Fig. 35; and

Fig. 37 is a detail section taken on the line 37—37 of Fig. 36.

Figure 1:
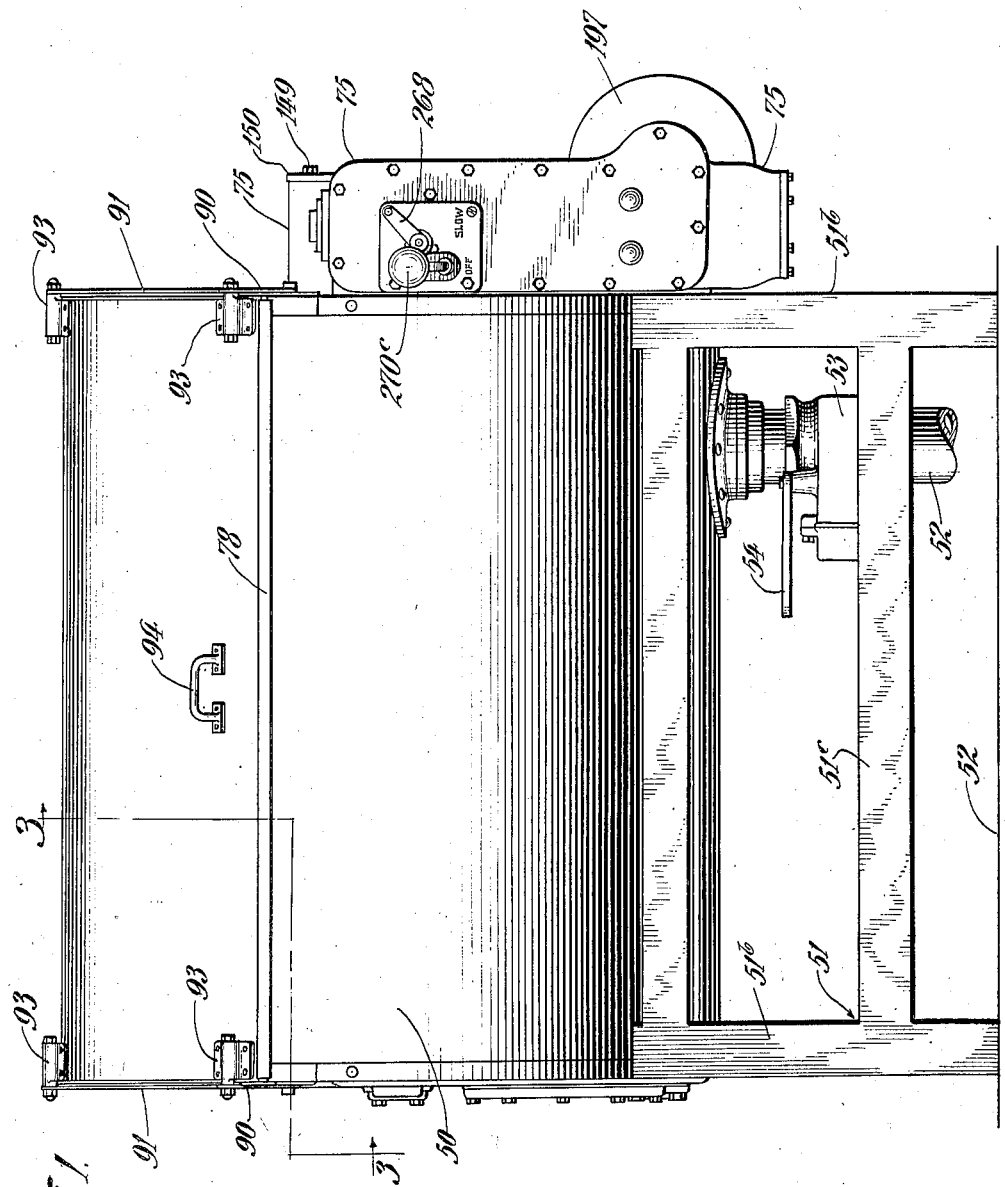

As illustrated in the accompanying drawings, the improved washing machine comprises an outer vessel 50 in the form of a sheet metal cylinder having its axis extending horizontally and having the lower portion thereof resting on a supporting frame 51 which comprises horizontal frame members 51$^a$ bearing on the floor or other support 52 and connected at their ends with upwardly extending legs 51$^b$ which are united by the longitudinal side frame members 51$^c$ and with the arc-shaped transverse members 51$^d$ upon which the cylinder rests. The lower portion of the cylinder 50 is provided with an outlet conduit 52 through which the water or other washing fluid within the cylinder may be drained away and the flow through this conduit is controlled by a valve 53 having an operating handle 54. Within the stationary outer cylinder 50 there is an inner rotatable cylinder 55, also formed of sheet metal, which serves as the clothes-containing vessel and this vessel and its load are adapted to be supported on the end walls of the outer cylinder. The outer cylindrical wall 56 of the outer cylinder is secured at one end to a sheet metal end wall 57 which has its outer edge bent outwardly to form an annular flange 58 which fits on the inside of the cylindrical wall and is then reversely bent to form another annular flange 59 seated against the outer side of the wall 56, as shown in Fig. 11. These interfitting parts are adapted to form a water-tight closure and the end wall 57 carries a casting 60 of semi-circular outline which is secured to the end wall around its edge by a plurality of studs 61 and which carries at the center of the end wall a cylindrical hub 62 having fitted in the outer portion thereof a detachable cap 63. This cap has an annular flange 63$^a$ which seats against a gasket 64 and which is secured to the casting 60 by studs 65. The cap 63 has secured thereto by means of a pin 66 the reduced outer end of a stub shaft 67 which extends inwardly through a packing gland 68 having an annular flange 68$^a$ overlapping the surrounding portions of the end wall 57 and having a threaded portion 68$^d$ which engages the internally threaded portion of the hub 62. This stub shaft 67 is adapted to support one end of the inner clothes-containing cylinder 55, as hereinafter more fully described. At the end opposite the wall 57, the outer stationary cylinder 50 is provided with another sheet metal end wall 70 which is similarly provided around its outer edge with a flange 71 engaging the inner side of the cylindrical wall 56 and the reversely bent cylindrical flange 72 engaging the outer side thereof. At its central part, the end wall 70 is provided with an opening and around this opening there is secured a hub 73 which serves to support the adjacent end of the inner cylinder 55 as hereinafter described. Within the flange 71 of the end wall 70, there is seated a portion of the casing 75 in which is located the driving and reversing mechanism of the inner cylinder 55 and this casing 75 is attached to the end wall 70 by means of a plurality of studs 76 having their heads located on the inside of the end wall, as shown particularly in Fig. 12.

Figure 2:
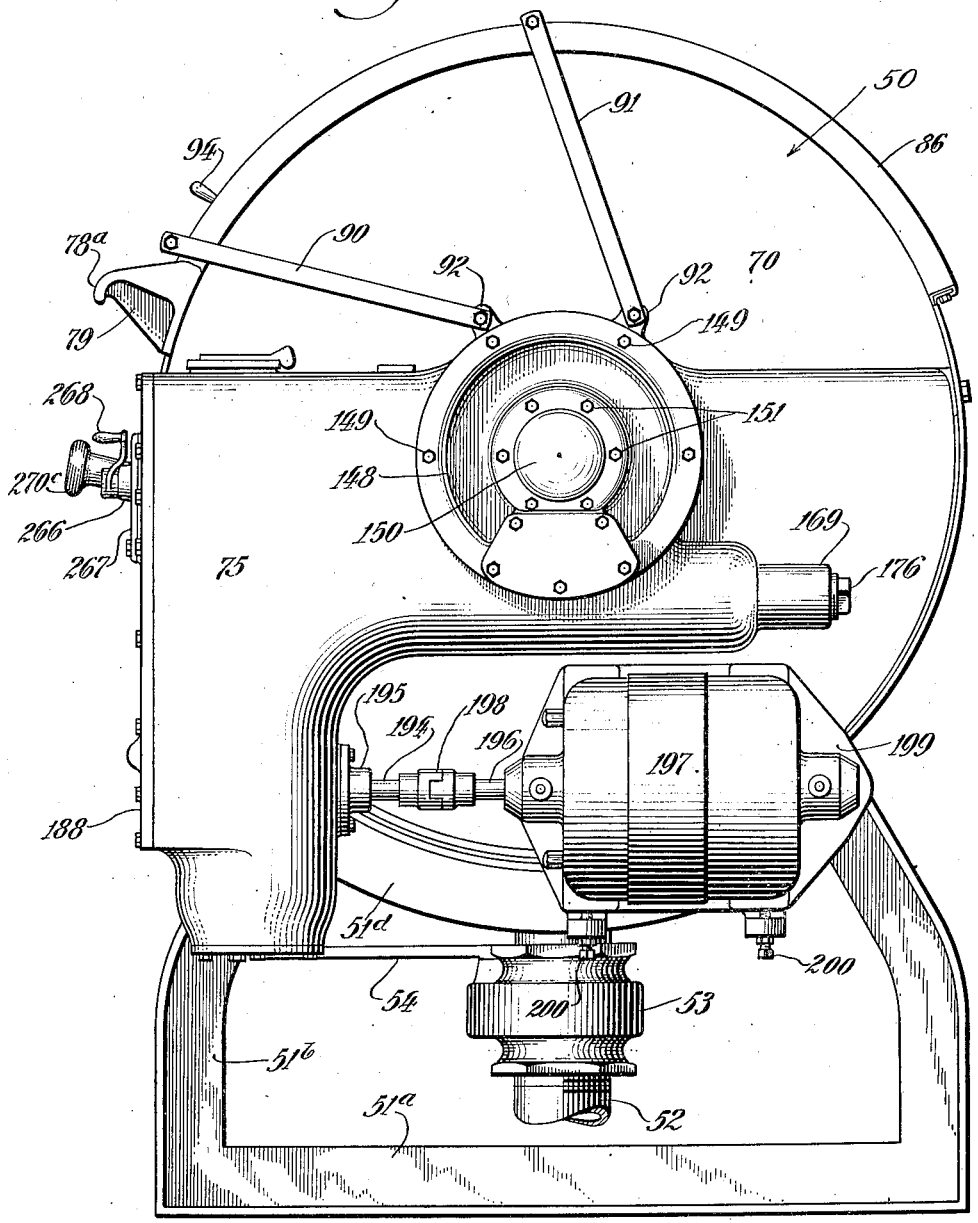
Fig. 2 shows an end elevation of the washing machine looking toward the left as viewed in Fig. 1.

The outer cylinder 50, formed by the cylindrical wall 56 and the end walls 57 and 70, is provided above its axis and on the forward side thereof with an opening 77 through which the clothes are adapted to be inserted and withdrawn from the machine. This opening is formed in the cylindrical wall 56 and at the lower edge of this opening there is provided an outwardly extending ledge 78 which extends throughout the length of the cylinder with its outer edge curved downwardly as shown at 78$^a$ and with its inner edge bent downwardly to form a flange 78$^b$ located on the inner side of the outwardly offset portion 56$^a$ of the cylindrical wall to which this flange is secured. The ends of the ledge 78 are attached to brackets 79 secured to the cylinder 50 at opposite ends of the cylindrical wall. At the upper edge of the opening 77, the sheet metal of the wall 56 is bent into the form of a cylindrical bead 80 in which is located a rod 81 extending from end to end of the cylinder and secured in the end walls thereof, as shown in Fig. 9. The opening 77 is adapted to be closed by an arc-shaped sheet metal cover 83, the upper and lower edges of which are coiled inwardly to form cylindrical beads 84 mounted on inner supporting tubes 85. The ends of the cover 83 are adapted to overlie the curved flanges 58 and 71 of the end walls of the cylinder which, in the region opposite the opening 77, have their outer portions bent upwardly to form flanges 86, as illustrated in Fig. 8. When the cover is in its closed position, as shown in Fig. 3, the ends thereof are adapted to overlie the flanges 58 and 71 and the bead 84 at the lower edge of the cover is adapted to engage the ledge 78 while the bead at the upper edge of the cover is adapted to engage the cylindrical wall 56 adjacent to the bead 80. The cover 83 is mounted for movement on pivotally supported arms 90 and 91, the arms 90 at opposite ends of the cylinder 50 being attached to the forward edges of the cover while the arms 91 at opposite ends of the cylinder are attached to the rear edge thereof. The lower or inner ends of the arms 90 and 91 are pivotally mounted on ears 92 which are carried by the end casings 60 and 75 and the outer ends of these arms are pivotally connected to brackets 93 which are riveted to the cover 83. The arrangement and inclination of the arms 90 and 91, as shown particularly in Figs. 2 and 3, is such that when the operator engages the upwardly projecting handle 94 and pushes upwardly thereon, the movement of the arms 90 and 91 about their pivots serves to elevate the cover 83 from the cylinder as it moves rearwardly over the upper portion of the cylindrical wall 56. The extent of the opening movement of the cover 83 is limited by a stop 95 which, as shown in Fig. 4, is formed by bending outwardly two adjacent sections 56$^b$ and 56$^c$ of the cylindrical wall and uniting these sections by bolts 96. When the cover reaches the limit of its open position, the bead 84 engages the stop 95 and prevents further movement. When the cover is returned to its closed position, its movement is limited by the engagement of the lower edge of the cover with the ledge 78.

The cylindrical wall 97 of the inner rotatable cylinder 55 is provided with a plurality of circular openings not shown through which the washing fluid is adapted to pass to and from the inner chamber of the inner cylinder during its rotary movement. This cylindrical wall 97 is united at its ends with the end walls of the cylinder. At the end opposite the driving mechanism, the cylindrical wall 97 is united with a sheet metal end wall 100 having an annular flange 101 which overlaps the wall 97 and is secured thereto as shown in Fig. 11. The wall 100 is deflected inwardly at the central portion thereof as shown at 100$^a$ and this part is attached by rivets 102 to the annular flange 103$^a$ of a hub member 103 provided with a bushing 104 in which is journaled the stub shaft 67 previously described. At the other end of the washing machine, the inner cylinder 55 is provided with a sheet metal end wall 105 made up of two sheet metal layers 105$^a$ and 105$^b$ having flanges 106 which overlie and are secured to the end of the wall 97. The two portions 105$^a$ and 105$^b$ of this end wall are spread apart at their centers to form a chamber 107 in which is mounted a bearing member 108 having an annular flange 108$^a$. The outer portions of this flange are secured to the outer layer 105$^a$ of the end wall by means of rivets 109 and the intermediate portions of this bearing member are provided with bosses 110 engaged by rivets 111 by which the bearing member is secured to both of the wall members 105$^a$ and 105$^b$. The cylindrical portion 108$^b$ of the bearing member is journaled in the bearing bracket or hub member 73 previously described. When it is desired to remove the inner cylinder 55, the stub shaft 67 can be withdrawn through the opposite end of the outer cylinder 50 by removing the cap member 63 shown in Fig. 11 and then the bearing member 108 can be withdrawn from the shaft 145 and shield 73.

Between the end walls 100 and 105 of the inner cylinder 55, there are mounted a number of clothes lifting or agitating blades 115 each having the form shown particularly in Fig. 10. Each blade 115 is made up of a sheet metal plate 116 which is bent around a tubular member 117 mounted on a rod or bolt 118 which extends between and through the end walls 100 and 105 of the cylinder with its head overlapping one end of the wall, as shown in Fig. 11, and with the other end thereof engaged by a nut, as shown in Fig. 12. After being bent around the tube 117, the opposite parts of the metal sheet 116 are brought into close contact with each other, as shown in Fig. 10, and extended radially outward with their outer edges adapted to engage a recess 119 which is formed by punching the outer wall 97 of the cylinder to form two inwardly extending shoulders on opposite sides of this recess. These blades 115 extend throughout the length of the cylinder and for some distance inwardly from its outer annular wall so that as the cylinder rotates these blades carry the clothes upwardly until they slide off of the blade and fall downwardly to be picked up by the next blade of the series.

The inner cylinder 55 is provided with a clothes receiving opening 120 formed in its cylindrical wall 97 and at the edges of this opening the wall 97 is directed inwardly as shown at 121 and formed into a longitudinal bead 122 which is engaged by a rod 123 secured in the end walls of the cylinder. These radially extending wall portions 121 which form the boundaries of the opening 120 fulfill the same function as the lifting blades 115 during the rotation of the cylinder. This opening 120 is adapted to be closed by a door 125 which is concentric with the axis of the cylinder and which has its longitudinal edges bent into the form of beads 126 engaged by the longitudinal rods 127. These rods 127 are pivotally mounted on supporting arms 128 and 129 having their inner ends pivoted on pins 130 secured to the hub member 103 and the bearing member 108 carried by the end walls of the cylinder. The locations of the pins 130 with respect to the axis of the cylinder are such that when a movement is imparted to the cover 125 toward open position, as indicated by the arrow 131 in Fig. 5, the cover is lifted upwardly from the circular edges of the end walls of the cylinder as it moves to open position over the adjacent cylindrical wall 97. In order to secure the cover 125 in either closed or open positions, the arms 128 have latch members 133 slidably mounted thereon and provided with handles 134 adapted to be engaged by the fingers of the operator. Each latch member 133 is provided with a lug 135 to which is attached the outer end of a coil spring 136 and the inner end of each coil spring is connected to a bracket 137 extending outwardly from the adjacent arm 128. Each coil spring 136 thus tends normally to move the latch member 133 inwardly to engage a curved bar 138 attached to the adjacent end wall of the cylinder. This bar is made up in three sections 138$^a$, 138$^b$ and 138$^c$ and these sections are spaced apart to form two notches 139 and 140 each adapted to receive the latch member 133 when the cover 125 is in proper position. The notch 139 is so located that when the cover 125 reaches its closed position with the edges thereof engaging the adjacent walls of the cylinder, the spring 136 moves the latch member 133 into engagement with this notch, the edges of which are inclined to form a wedging engagement with the correspondingly inclined surfaces 133$^a$ of the latch member. The notch 140 in each bar 138 is adapted to be engaged by the associated latch member when the cover is in its full open position and in order to determine this position definitely, the section 138$^c$ of the bar is offset outwardly from the axis of the cylinder to such an extent that it engages the inner end of the latch member and directs the wedge surfaces 133$^a$ into the notch 140 when the cover reaches a predetermined open position. By means of these latch members the cover 125, which is preferably provided with perforations similar to those in the outer wall of the inner cylinder, may be securely held in either open or closed position during the rotary movement of the inner cylinder.

The inner cylinder 55 is adapted to rotate in its bearings carried by the outer cylinder, and to have its direction of rotation periodically reversed, by certain driving mechanism which is located in the housing 75 attached to the end wall 70 of the outer cylinder. This rotary movement is imparted to the inner cylinder 55 through a driving sleeve 145, shown particularly in Fig. 12, which is journaled in roller bearings 146 mounted in the bearing apertures 147 which are formed in the inner wall 75$^a$ of the housing and in the detachable circular end plate 148 of this housing which is normally secured in closed position by means of the studs 149. This end plate 148 is provided with an auxiliary removable cover 150 having flanges 150$^a$ which engage its aperture 147 and it is adapted to be secured in place by studs 151. An auxiliary cover plate 150$^b$ closes a sight opening 147$^b$ located below the opening 147. The sleeve 145 extends through the end wall 70 and terminates at its inner end in a circular portion 145$^a$ provided with a circumferential series of longitudinal tapered grooves adapted to form a driving connection with the corresponding grooves and ribs 152 which are formed in the bearing member 108. The sleeve 145 is secured in this driving engagement with the bearing member 108 of the inner washing cylinder 55 by means of a long bolt or stud 153 which extends through this sleeve and threadedly engages the bearing member 108 at 154. The head 153$^a$ of this bolt engages a washer 155 which seats against the end of the sleeve and against the adjacent roller bearing 146 and is adapted to assume a central position wherein it is out of contact with the bore of the sleeve throughout the remaining portion of its length. The sleeve 145 closely fits the inner rings of the roller bearing 146 and on the inner side of the innermost roller bearing the enlarged portion 145$^c$ of the sleeve engages an annular moisture collecting member 155 which is secured in place by the studs 156 which serve also to secure the hub member 73 to the end wall 70 and to the end portion 75$^a$ of the housing 75. Between the moisture collector 155 and the outer end of the bearing member 108$^b$, there is mounted a sylphon bellows 157 which has a flange at one end clamped between the hub member 73 and the end wall of the cylinder and which has an inwardly directed flange at the other end bearing against a collar 158 which seats against the end of the bearing member 108. The convolutions of this sylphon bellows surround the sleeve 145 within the hub member 73 and are adapted to prevent the escape through the hub member from the chamber of the cylinder 50 of the washing fluid which is contained therein. If any moisture passes through this bearing and through the sylphon bellows, it is adapted to be collected by the moisture collector 155 which is provided with a series of annular grooves 159 surrounding the sleeve and also with an annular moisture collecting passage 160 which extends around the V-shaped grooves 161 formed in the sleeve and which communicates with a downwardly directed passage 162 having communication with a pipe 163 by which any moisture which collects in the grooves 161 is directed downwardly and outwardly through the wall of the housing 75. If any excess oil finds its way beyond the inner roller bearing, it is trapped by the annular groove 159 and is directed downwardly through a passage 164 to the interior chamber of the housing 75 in which the driving mechanism is located.

The rotation of the driving sleeve 145 and the corresponding rotation of the cylinder 55 is effected by a worm gear 165 which is secured on the sleeve by a key 166 between the roller bearings 146. As shown in Figs. 12 and 14, the worm gear 165 is driven by a worm 167 which is splined on a horizontal shaft 168. One end of this shaft is journaled in a bearing 169 carried by the housing 75 and the other end of the shaft is journaled in a bearing 170 which is formed in the bearing frame 171 mounted within the housing 75 and held in place partly by a surrounding flange 172 which is formed on the inner wall of the housing. The worm 167 is engaged on its opposite ends by collars 173 and these collars are in turn engaged by the ends of coil springs 174 mounted on the shaft 168. The outer ends of the springs 174 are engaged by collars 175 which are secured on the shaft 163 and these springs are adapted to be compressed against these fixed collars 175 upon longitudinal movement of the worm 167 and collars 173 on the shaft. This longitudinal movement, in one direction or the other, may occur upon the commencement of rotation of the shaft 168 or upon the reversal of the direction of rotation thereof and the yieldable mounting of the worm permits it to shift longitudinally while the inertia of the inner cylinder 55 and its contents is being overcome. At the outer end of the shaft 168, the bearing 169 is closed by a detachable plug 176. The rotation of the horizontal shaft 168 is effected by a bevel gear 180 which is secured on the inner end thereof within the yoke 171ª of the bearing frame 171. This bevel gear 180 is adapted to be driven by one or the other of two bevel gears 181 and 182 which are arranged in the manner of differential gears on the main driving shaft 183 which extends vertically and is journaled in bearings carried by the bearing frame 171, as shown particularly in Fig. 19. The hub 184 in which the lower end of the shaft 183 is journaled, extends downwardly between a pair of blocks 185 and 186, as shown particularly in Figs. 14, 16 and 17, and these blocks with the lower part of the frame are secured to the removable cover plate 188 of the housing 75 by means of the studs 189 which extend through all of these members, as shown in Fig. 16, and threadedly engage the recesses 190 formed in the cover plate. The lower end of the shaft 183 has a worm wheel 191 keyed thereon and secured in place by a nut 192 and this worm wheel is driven by a worm 193 keyed on a shaft 194 and mounted between ears 185ª and 186ª which are formed on the blocks 185 and 186, respectively, and have the shaft 194 journaled therein. This shaft is also journaled in a cap 195 which is detachably secured in the wall of the housing 75, as shown in Fig. 14, and it serves as an extension of the shaft 196 of an electric motor 197 by which all of the operating mechanism of the washing machine is actuated. The shafts 194 and 196 are connected through a coupling 198 and the motor 197 is mounted on a plate 199 carried by the frame of the housing 75. The motor is adjustable on the plate 199 by means of set screws 200 in order to bring its shaft into accurate alignment with the extension shaft 194. The electric circuit of the motor 197 has a controlling switch therein, which may preferably be conveniently located with respect to other operating members of the washing machine.

Figure 23:
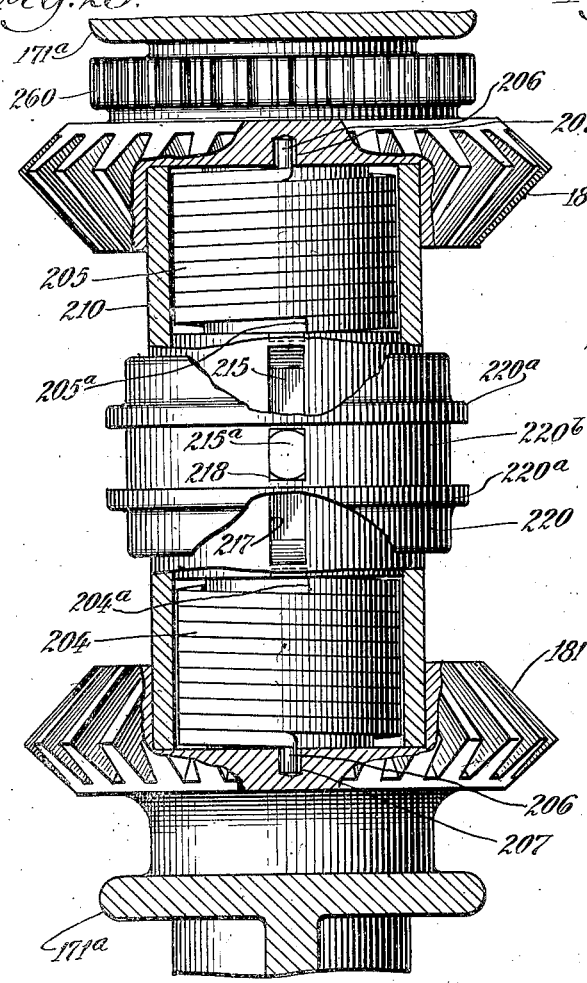
Fig. 23 shows a side elevation of the reversing mechanism with a portion thereof in vertical section.
Figure 24:
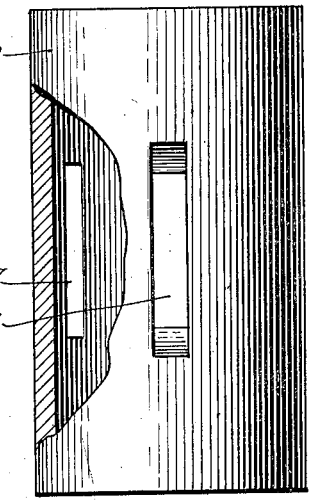
Fig. 24 shows a side elevation of the sleeve which is mounted between the bevel gears shown in Fig. 23.
Figure 26:
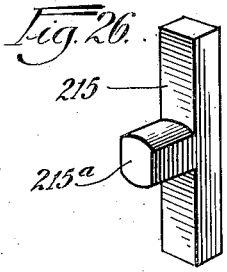
Fig. 26 is a perspective view of the key by which the driving connection is established between the sleeve illustrated in Fig. 24 and the slidable clutch member shown in Fig. 23.
Figure 25:
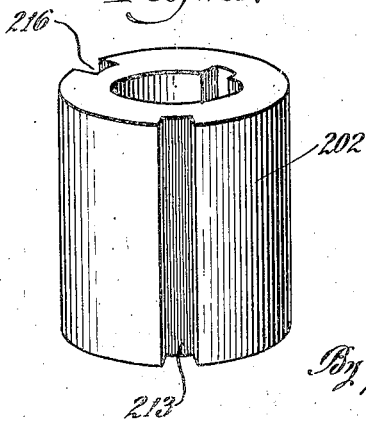
Fig. 25 is a perspective view of the inner collar or sleeve which is mounted on the rotatable shaft within the clutch mechanism shown in Figs. 20, 21 and 23.

The shaft 183, which rotates constantly when the electric motor 197 is in operation, is adapted to drive the intermediate shaft 168 alternately through the gears 181 and 182 so that the direction of rotation of the inner cylinder 55 of the washing machine is periodically reversed and this reversal is effected by clutching the gears 181 and 182 alternately to the main driving shaft 183. The parts constituting this clutching and reversing mechanism are illustrated particularly in Figs. 18 to 26, inclusive. Each of the gears 181 and 182 is secured to one of the tubular bushings 201 which are rotatably mounted on the shaft 183 and these bushings extend inwardly toward each other beyond the inner faces of the gears with their ends engaging a collar 202 mounted on the shaft 183 and secured in driving engagement therewith by a key 203, as shown in Fig. 22. A coil spring 204 is mounted on the bushing 201 of the gear 181 and the bushing of the other gear 182 has mounted thereon a coil spring 205 which is similar to the spring 204 except that the inclination of its coils is reversed. Each spring terminates at its outer end in a longitudinally directed pin 206 engaging a recess 207 in its gear and the inner ends of the springs 204 and 205 terminate in shoulders 204ª and 205ª, the faces of which are parallel to the longitudinal axis of the shaft 183, as shown in Fig. 23. These springs extend partially into recesses which are formed in the gears 181 and 182 and both the springs and the collar 202 are surrounded by a sleeve 210, the ends of which rotatably engage recesses 211 which are formed in the end faces of the gears 181 and 182. This sleeve 210 is constantly rotated, during the rotation of the shaft 183, through a driving connection which is established by a key 212 engaging a groove 213 in the sleeve 202 and having a part 212ª of reduced length which engages a slot 214 formed in the sleeve 210. The key 212 is held stationary with respect to the sleeve 210 by the engagement of the ends of the part 212ª with the ends of the slot 214, but the sleeve 210 is also provided with a relatively movable key 215 which slidably engages a key slot 216 formed in the sleeve 202 and which has a radially extending lug 215ª engaging the elongated slot 217 formed in the sleeve 210 and also engaging an aperture 218, of substantially the same size, which is formed in the clutch collar 220 surrounding the intermediate portion of the sleeve 210 and adapted to slide longitudinally thereon. When this clutch collar 220 is moved downwardly, for example, its engagement with the key 215 causes that key to slide longitudinally in the collar 202 until the lower end thereof projects beyond that collar into the path of the shoulder 204ª which is formed on the inner end of the lower spring 204. Since the key 215 is then rotating with the shaft 183, the engagement of the key with the end of the spring tends to unwind that spring about the adjacent bushing 201, the other end of the spring being held stationary by the gear 181 having connected thereto the inner cylinder 55 of the washing machine. The spring 204 continues to unwind until it establishes a sufficient frictional engagement with the sleeve 210 to hold the gear 181 in a relatively fixed position with respect to that sleeve, whereupon the gear 181 rotates and drives the gear 180 with its shaft 168 and the intermediate parts by which the inner cylinder 55 is rotated. The unwinding of the coil spring 204 serves not only to establish a driving connection between the rotating sleeve 210 and the gear 181 but it also performs the function of reducing the shock which would otherwise be occasioned by overcoming the inertia of the cylinder 55 and its contents. That shock is also overcome in part by the coil springs which are mounted on the shaft 168 on opposite sides of the worm 167. The shaft 168 and the cylinder 55 continue to be rotated by the gear 181 until the clutch sleeve 220 is moved upwardly and when that movement takes place the driving key 215 is released from its engagement with the lower spring 204 and moves into engagement with the end 205ª of the upper coil spring 205, whereupon the upper spring is unwound on its bushing until it frictionally engages the inner surface of the sleeve 210 and establishes a driving connection between that spring and the upper bevel gear 182. The gear 182 then drives the gear 180 and the shaft 168 to rotate the clothes-containing cylinder 55 in the opposite direction and that rotation continues until the clutch sleeve 220 is again operated to disengage the key 215 from the spring 205.

The clutch collar 220, which rotates continuously during the rotation of the shaft 183, is provided with a pair of annular flanges 220ª forming an intermediate groove 220ᵇ engaged by the forked arms 221ª of a shifting member 221 which is pinned on a vertically shiftable rod 222 having upper and lower bearings 223 and 224, respectively, formed on the frame 171. The upper end of the shifting rod 222 is provided with a head 222ᵃ having formed therein a transverse groove 225 slidably engaged by the head 226ᵃ of a pin 226 which is pivotally mounted in the end of a shifting lever 228. This shifting lever is pivotally mounted at 229 on a supporting link 230 which is in turn pivoted at 231 on the frame 171, as shown in Fig. 18. The end of the lever 228 opposite the pin 226 is bifurcated to form a pair of arms 228ᵃ in which are mounted pins 232 on which are mounted rollers 233. These rollers are adapted to receive between them a rotatable shifting cam 235 by which the lever is rocked about its pivot 229 to effect a corresponding shifting movement of the rod 221 and the consequent shifting of the clutch collar 220. The cam 235 is driven from the upper end of the shaft 183 through connections which are illustrated particularly in Figs. 27 and 28. As there shown, the cam 235 is keyed on a horizontal shaft 236 which is journaled in a bearing 237 carried by the frame 171 and also in a removable bearing member 238 mounted in a gear housing 239 carried by that frame between these bearings. The shaft 236 carries a relatively fixed worm wheel 240 which meshes with a worm 241 keyed on the upper portion of the shaft 183 so that as this shaft 183 is operated to effect the rotation of the driving sleeve 210, the cam 235 is continuously operated to effect an intermittent reciprocation of the clutch sleeve 220 and a corresponding periodic reversal of the direction of rotation of the gear 180 and the clothes-containing cylinder 55.

The clutch sleeve 220 is adapted to be retained automatically in either its upper or lower positions for effecting rotatory movement of the inner cylinder 55 in one direction or opposite thereto, or in an intermediate neutral position, by certain locking mechanism shown particularly in Figs. 15 and 18. This mechanism comprises a lever 242 which is pivoted on a pin 243 secured to the cover plate 188 of the housing 75. The lever 242 extends transversely to the shifting rod 222 and is provided with an elongated slot 244 which is engaged by a square block 245 pivotally mounted on a pin 246 which extends outwardly from the shifting rod 222. When this shifting rod is moved vertically, the block 245 is adapted to slide in the slot 244 to the extent necessary to permit the required angular movement of the lever 242. When this angular movement of the lever 242 takes place, the position of the lever is varied with respect to a locking lever 248 which is pivoted on another pin 249 secured to the housing cover 188. A spring 250 is coiled around the pin 249 with one end engaging a stop 251 carried by the cover 188 and with the other end engaging a pin 252 projecting from the lever 248. This spring tends to force the lever 248 toward the right, as viewed in Fig. 15, so that a roller 253 mounted on a pin at the lower end of the lever 248 is maintained in engagement with the end of the lever 242 on which are formed two inclined faces 242ᵃ with an intermediate curved face 242ᵇ. When the lever 242 is in horizontal position with the curved face 242 engaging the roller 253, as shown in Fig. 15, the clutch sleeve 220 is in neutral position wherein the shaft 183 will rotate without driving the shaft 168. When the shifting rod 222 is moved either upwardly or downwardly from neutral position, the roller 253 engages one or the other of the inclined faces 242ᵃ on the lever 242 and thus holds the clutch member 220 against accidental movement from the position in which it is set.

Figure 33:
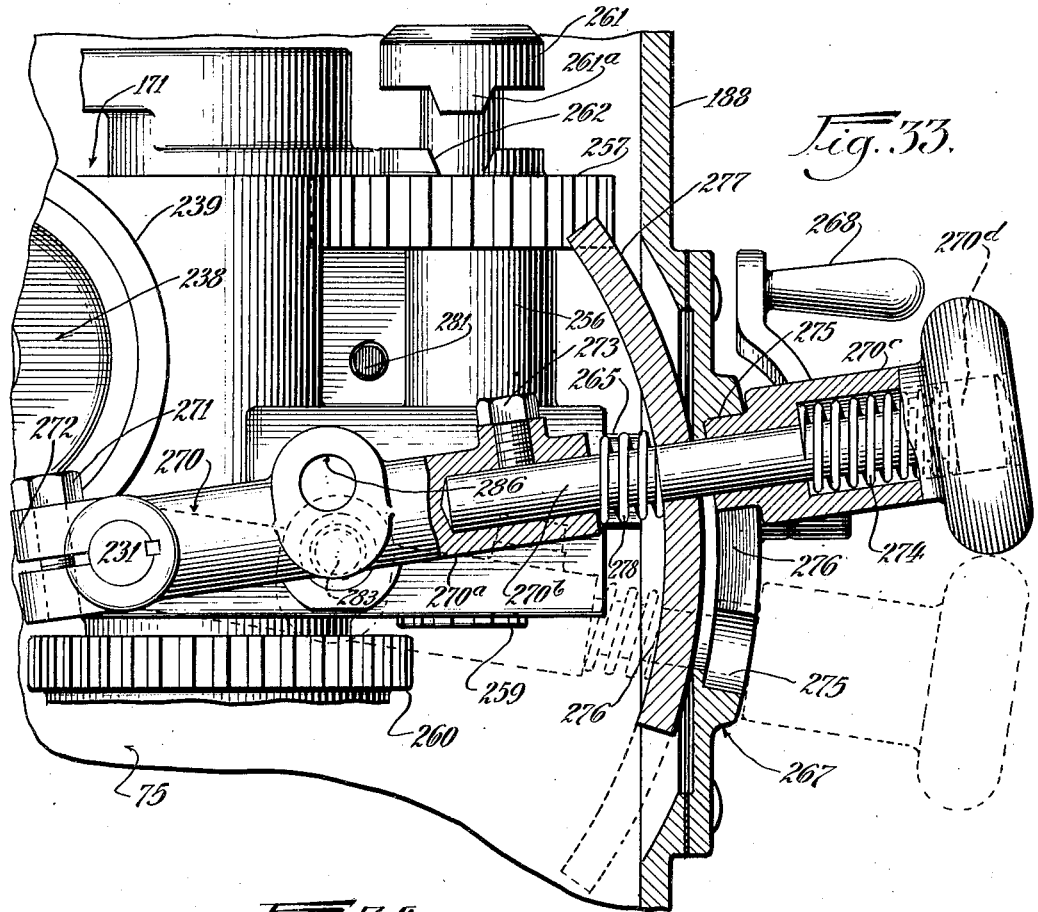
Fig. 33 is a vertical section taken through the upper portion of the casing of the driving mechanism on the line 33—33 of Fig. 15.
Figure 34:
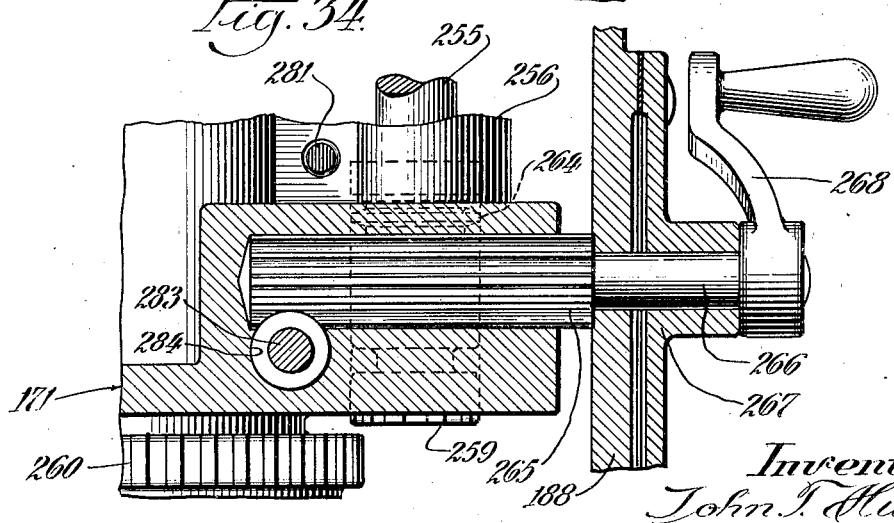
Fig. 34 is a detail section taken on the line 34—34 of Fig. 29.

When the clutch 220 is thrown into neutral position, by the interaction of a stop member 281 carried by the lever 228 with converging flanges 280 as hereinafter described (see Figs. 18 and 19) to stop the rotation of the inner cylinder 55 of the washing machine or when the motor 197 is stopped to produce a similar effect, the inner cylinder 55 may stop in such a position that the clothes-receiving opening 120 in the inner cylinder will not be in position opposite the corresponding opening 77 in the outer cylinder 50, thus making it impossible to open the cover 125 of the inner cylinder to gain access to the interior chamber of the inner cylinder without rotating the inner cylinder to such a position that the two openings will be in alignment. The driving mechanism of the washing machine has therefore been provided with means by which a relatively slow and controlled power driven movement of the inner cylinder 55 may be effected after the clutch 220 has been thrown into neutral position, for the purpose of bringing the openings of the inner and outer cylinders into alignment. The means by which this is accomplished is shown particularly in Figs. 15, 18, 19, 27, 28, 29, 30, 33 and 34. Referring to Figs. 27, 28 and 29, it will be found that a vertical auxiliary driving shaft 255 is journaled in a bearing 256 carried by the frame 171. This shaft has a gear 257 rotatably mounted thereon and having its hub journaled in the same bearing 256. The gear 257 meshes with a driving pinion 258 which is formed on the worm 241 or otherwise secured to the main driving shaft 183. The lower end of the auxiliary driving shaft 255 has a pinion 259 formed thereon and this pinion is adapted to mesh with a gear 260 which is formed integrally with or secured to the upper bevel gear 182 which meshes continuously with the gear 180 secured on the intermediate driving shaft 168. The upper end of the auxiliary shaft 255 carries a relatively fixed clutch disk 261 having clutch teeth 261ᵃ formed on opposite sides thereof to engage notches 262 which are formed in the upper face of the hub of the gear 257. The shaft 255 is adapted to be reciprocated vertically in the bearing 256 and when it is moved downwardly to the position shown by dotted lines in Fig. 27, the pinion 259 is moved into mesh with the gear 260 and at the same time the clutch teeth 261ᵃ are moved into engagement with the notches 262 so that a driving connection is then established between the rotating gear 257 and the shaft 255 and a driving connection is simultaneously established between that shaft and the gear 182. While the shaft 255 remains in this lower position, the inner cylinder 55 of the washing machine will continuously rotate until it is observed that the openings of the inner and outer cylinders are in alignment when the operator may disconnect this auxiliary driving mechanism by shifting the shaft 255 to its upper position. For the purpose of permitting the manual shifting of the auxiliary shaft 255, the enlarged intermediate portion 255ᵃ thereof, which is journaled in the bearing 256, is provided with a plurality of annular rack teeth 264 which mesh with an elongated pinion 265 carried on the inner end of a short shaft 266 journaled in a bearing carried by a plate 267 attached to the outer cover 188 of the housing 75, as shown in Fig. 34. The outer end of this shaft has a handle 268 secured thereon and when the operator turns this handle in the appropriate direction, the engagement of the pinion 265 with the rack teeth 264 serves to shift the auxiliary shaft 255 vertically in the desired direction.

In order to prevent the operation of the auxiliary feeding mechanism when the main driving mechanism is in operation, certain interlocking mechanism is provided for preventing the operation of the auxiliary driving means when the clutch member 220 is not in neutral position and for preventing the clutch member 220 from being thrown to one of its driving positions when the auxiliary driving means is in operation. To this end means are provided for rendering the shifting cam 235 inoperative when the auxiliary driving means is operative and for this purpose the shaft 231 upon which the supporting lever 230 is fixed, is provided at its opposite end with an operating lever 270, the hub of which is clamped on the shaft 231 by a stud 271 engaging the ears 272, as shown in Fig. 33. The body portion 270$^a$ of the lever 270 is provided with a socket in which is mounted the cylindrical extension 270$^b$ arranged to be secured in place by a set screw 273. The outer end of the rod 270$^b$ has a handle 270$^c$ slidably mounted thereon and this handle has an internal chamber in which is located a coil spring 274 engaging the end wall of the chamber and the head 270$^d$ of the rod 270$^b$ so that the handle 270$^c$ is normally forced inwardly to cause the reduced portion 270$^d$ to engage one or the other of the notches 275 which are formed in the plate 267 previously described. A slot 276 is formed in the plate 267 to permit the vertical angular movement of the lever 270 and this slot is closed by a sliding plate 277 which is mounted on the portion 270$^b$ of the lever and retained in place against the curved inner face of the plate 267 by a coil spring 278. When the lever 270 is moved downwardly from the position shown by full lines in Fig. 33 to the lower position shown by dotted lines, the supporting link 230 of the lever 228 is rocked from the position shown in Fig. 18 to the position shown in Fig. 19, in which latter position, the rollers 233 are moved out of possible engagement with the cam 235 so that this cam may then continue to rotate without effecting the operation of the clutch sleeve 220. At the same time that this movement of the lever 228 to an inoperative position is effected, the clutch sleeve 220 is automatically moved to a neutral position by the engagement of two converging flanges 280, carried on the inner side of the lever 228, with a circular stop member 281 which is carried by a pin fixed in the frame 171, as shown in Fig. 28. The flanges 280 and the stop member 281 are so located that when the lever 228 is shifted to the position shown in Fig. 19, the end of the lever which carries the block 226$^a$ is automatically moved to a position such that the shifting rod 222 is actuated to locate the clutch sleeve 220 in neutral position, in which position it is retained against accidental movement by the engagement of the roller 253 with the curved face 242$^b$ of the lever 242, shown in Fig. 15. The clutch sleeve 220 is thus retained in neutral position by two separate means, namely, by the flanges 280 and the lever 242, and one of these means is rendered positive in its operation, during the operation of the auxiliary driving means, through a locking connection which is made with the operating lever 270. The locking connection just referred to is established by the operation of moving the auxiliary driving shaft 255 to its operative position. When that movement occurs, the elongated pinion 265, shown particularly in Figs. 29 and 34, by which the shifting of the shaft 255 is effected, serves also to actuate a rod 283 which extends transversely through an aperture 284 formed in the frame 171, as shown in Figs. 29 and 34. The rod 283 is provided with annular rack teeth 285 which mesh with the pinion 265 so that when the pinion is rotated to shift the shaft 255 to its lower position, the end of the rod 283 is projected out of the opening 284 and, if the lever 270 is then in registering position, the end of the rod will engage an opening 286 which is formed in the lever 270, as shown in Fig. 33. If the lever 270 is in the upper position shown by full lines in Fig. 33, corresponding to the position of the lever 228 shown in Fig. 18, the end of the rod 283 will engage the side of the lever 270, upon the initial movement thereof, so that the operator is prevented from turning the pinion 265 by the handle 268 in order to shift the auxiliary driving shaft 255 to its lower operative position. However, if the lever 270 has been shifted downwardly to the position shown by dotted lines in Fig. 33, the opening 286 in the lever 270 will be in alignment with the opening 284 in which the rod 283 is mounted and the rod will then engage the opening 286 and hold the lever 270 in its lower position as long as the handle 268 remains in a position corresponding to the driving position of the auxiliary shaft 255. In this way, means are provided for positively preventing the operation of either the main driving and reversing mechanism or the auxiliary driving mechanism when either of these mechanisms is in operation. As shown in Fig. 32, the plate 267 is marked to indicate the proper positions of the lever 270 and the handle 268 for effecting the different desired operations of the machine.

The parts of the driving mechanism are so mounted that they may be removed through the side opening of the casing 75 upon removal of the cover plate 188. The frame 171 is attached to the cover plate 188, as shown in Figs. 14, 16 and 18. When these parts are removed, the shaft 168 is adapted to slide out of its bearing in the frame 171 and before effecting such removal it would be necessary to effect the removal of the lower cover plate 290 which is attached to the bottom of the casing 75, as shown particularly in Fig. 35, thereby carrying with it the parts which are mounted on that cover plate. These parts comprise an oil pump 291 of the gear type having a casing 292 in which are located two intermeshing gears 293 and 294. The casing 75 is partially filled with lubricating oil and the pump 291 is adapted to effect the circulation of this oil from the lower part of the casing through various parts of the driving mechanism. The oil passes by gravity into the pump chamber through the opening 295 and as the gears rotate in the directions indicated by the arrows 296 in Fig. 36, the oil is forced outwardly through the port 297. The gear 293 is rotatably mounted on a shaft 298 which is fixed in the upper wall of the pump housing 292 and the other gear 194 is fixed on the lower end of a hollow shaft 299 with the bore of which the port 297 communicates. The shaft 299 is journaled in a bearing 300 carried by the pump housing and the upper end thereof has a driving connection with the lower end of the shaft 183 through a coupling 301. The pump 291 is thus driven by the main driving shaft 183 and as the pump gears rotate, they effect a positive feed of oil upwardly through the bore 302 of the pump shaft and thence upwardly through the communicating bore 303 of the shaft 183. The oil is carried upwardly through the shaft 183 and discharged from the upper end thereof into an oil pan 304 which is secured on the upper end of the frame 171 by means of screws 305, as shown in Fig. 27. A portion of the oil which is fed into the pan 304 flows downwardly through a port 306 into the chamber in which the form wheel 240 is mounted thus lubricating this worm wheel and the intermeshing worm 241. From the chamber of the worm wheel, the oil flows outwardly through the ports 307 and downwardly over the frame 171 to the upper side of the bearing 170 where it enters the port 308, shown in Fig. 30, and lubricates the bearing of the shaft 168. Other portions of the oil in the pan 304 overflow the side walls thereof and pass downwardly over the driving mechanism to lubricate all parts thereof. In this way, all of the parts of the mechanism which are not actually immersed in the oil contained in the casing 75, are lubricated by the circulation of oil effected by the pump 291.

Although one form of the invention has been shown and described by way of illustration, it will be understood that it may be constructed in various other embodiments within the scope of the appended claims.

I claim:

1. Driving mechanism for a washing machine comprising a rotatable part, a driving shaft, a rotatable member mounted on said shaft and having a connection to rotate said part, a tubular member surrounding said shaft and rotatable therewith, an expansible member between said rotatable member and said tubular member and movable with said rotatable member, and a clutch member movable with said tubular member and having a part movable into engagement with said expansible member to expand the latter to form a frictional driving engagement between said tubular member and rotatable member whereby said rotatable member is positively driven by said shaft.

2. Driving mechanism for a washing machine comprising a rotatable part, a driving shaft, a rotatable member mounted on said shaft and having a connection to rotate said part, a tubular member mounted to rotate with said shaft, a coil spring mounted on said shaft within said tubular member and having one end attached to said rotatable member, said coil spring having a projecting shoulder at its other end, and means carried by said tubular member and movable into the path of said shoulder for causing said spring to expand and form a driving engagement with said tubular member.

3. Driving mechanism for a washing machine comprising a rotatable part, a driving shaft, a pair of rotatable members mounted on said driving shaft and connected to rotate said part, a tubular member mounted to rotate with said shaft between said rotatable members, a pair of oppositely inclined coil springs mounted on said shaft within said tubular member, one end of each of said springs being connected to one of said rotatable members, each of said springs having a shoulder, and a member rotatable with said tubular member and movable longitudinally thereof into the path of rotation of either of said shoulders for causing either of said springs to expand and form a driving connection with said tubular member.

4. Driving mechanism for a washing machine comprising a rotatable part, a shaft connected to rotate said part, a driving shaft, a pair of bevel gears rotatably mounted on said driving shaft and spaced apart, another bevel gear meshing with each of said first named gears and fixed on said first named shaft, a sleeve mounted to rotate with said driving shaft between said first named bevel gears, a pair of coil springs mounted on said driving shaft within said sleeve, each of said springs having a connection with one of said first named bevel gears at one end and having a shoulder at the other end, a clutch member movable longitudinally of said sleeve and having a driving connection with said shaft, and means movable into the path of rotation of either of said shoulders upon longitudinal movement of said clutch member for causing the spring carrying said shoulder to expand and form a frictional driving engagement with the inner surface of said sleeve.

5. The combination in a washing machine of a pair of vessels located one within the other, main driving mechanism for rotating the inner vessel in normal washing operation, said vessels having openings to receive clothes, auxiliary driving means including a drive connection selectively engageable with said main driving mechanism for rotating said inner vessel to bring said openings into alignment, and means associated with said drive connection for preventing the operation of said auxiliary driving means when said main driving mechanism is in normal washing operation condition and vice versa.

6. The combination in a washing machine of a pair of vessels located one within the other, said vessels having openings in their walls, main driving means for rotating said inner vessel and periodically reversing the direction of rotation thereof, auxiliary driving means adapted to be connected to said main driving means and operable when said main driving means is at rest for effecting the rotation of said inner vessel to cause said openings to align with each other, said auxiliary driving means including a selectively operable drive member through which said connection is effected.

7. The combination in a washing machine of a rotatable vessel having an opening in its wall, a shaft connected to rotate said vessel, driving mechanism for operating said shaft, means for controlling the actuation of said driving mechanism, auxiliary driving means adapted to be connected to said mechanism for actuating said shaft to rotate said vessel and thereby effect a predetermined positioning of said opening, and means for so connecting said auxiliary driving means.

8. The combination in a washing machine of a rotatable vessel, driving mechanism for rotating said vessel, a main driving shaft for operating said driving mechanism, clutch mechanism for connecting said driving shaft with said driving mechanism, auxiliary driving means connected to said shaft for actuating said driving mechanism to rotate said vessel, and means for preventing the operation of said auxiliary driving means when said clutch mechanism has been actuated to cause the rotation of said vessel by said main driving shaft.

9. The combination in a washing machine of a rotatable vessel, driving mechanism connected to rotate said vessel, a main driving shaft, means including a clutch member for causing said main driving shaft to rotate said vessel in either direction, an auxiliary driving shaft, and means for establishing a driving connection between said auxiliary driving shaft and said driving mechanism.

10. The combination in a washing machine of a rotatable vessel, driving mechanism connected to rotate said vessel, a main driving shaft, means including a clutch member for causing said main driving shaft to rotate said vessel in either direction, an auxiliary driving shaft, means for establishing a driving connection between said auxiliary driving shaft and said driving mechanism, and means for driving said auxiliary shaft from said main driving shaft.

11. The combination in a washing machine of a rotatable vessel, driving mechanism for rotating said vessel, a main driving shaft, means including a clutch for causing said main driving shaft to operate said driving mechanism, a gear connected to said driving mechanism, an auxiliary shaft, a pinion fixed on said auxiliary shaft, and means for reciprocating said auxiliary shaft to move said pinion into and out of mesh with said gear.

12. The combination in a washing machine of a rotatable vessel, driving mechanism for rotating said vessel, a main driving shaft, means including a clutch for causing said main driving shaft to operate said driving mechanism, a gear connected to said driving mechanism, an auxiliary shaft, a pinion fixed on said auxiliary shaft, means for reciprocating said auxiliary shaft to move said pinion into and out of mesh with said gear, means for reciprocating said clutch member, and means for preventing the operation of either of said reciprocating means when the other of said reciprocating means has been actuated to effect the operation of said driving mechanism.

13. The combination in a washing machine of a rotatable vessel, driving mechanism for rotating said vessel, a main driving shaft, means including a clutch member for connecting said driving shaft to said driving mechanism to rotate said vessel in either direction, means actuated by said driving shaft for periodically shifting said clutch member to reverse said direction of rotation, means for rendering said last named means inoperative while permitting the continued rotation of said driving shaft, manually controlled auxiliary driving means connectible to and operable by said main driving shaft for operating said driving mechanism, and means for preventing the operation of said auxiliary driving means until said clutch operating means has been rendered inoperative.

14. The combination in a washing machine of a rotatable vessel, driving mechanism for rotating said vessel, a main driving shaft, means including a clutch member for connecting said driving shaft to said driving mechanism to rotate said vessel in either direction, means actuated by said driving shaft for periodically shifting said clutch member to reverse said direction of rotation, means for rendering said last named means inoperative while permitting the continued rotation of said driving shaft, manually controlled auxiliary driving means connectible to and operable by said main driving shaft for operating said driving mechanism, means for preventing the operation of said auxiliary driving means until said clutch operating means has been rendered inoperative, and means actuated when said clutch operating means is rendered inoperative for locating said clutch member in neutral position.

15. The combination in a washing machine of a rotatable vessel, driving mechanism for rotating said vessel, a main driving shaft, means including a clutch member for connecting said driving shaft to said driving mechanism to rotate said vessel in either direction, means actuated by said driving shaft for periodically shifting said clutch member to reverse said direction of rotation, means for rendering said last named means inoperative while permitting the continued rotation of said driving shaft, manually controlled auxiliary driving means connectible to and operable by said main driving shaft for operating said driving mechanism, means for preventing the operation of said auxiliary driving means until said clutch operating means has been rendered inoperative, means actuated when said clutch operating means is rendered inoperative for locating said clutch member in neutral position, and means for holding said clutch member in neutral position and maintaining said clutch operating means inoperative during the operation of said auxiliary driving means.

16. The combination in a washing machine of a rotatable vessel, driving mechanism for rotating said vessel, a main driving shaft, clutch mechanism for connecting said main driving shaft to said driving mechanism, an auxiliary driving shaft, and means for simultaneously establishing a driving connection between said main driving shaft and said auxiliary driving shaft and between said auxiliary driving shaft and said driving mechanism.

17. Driving mechanism for a washing machine comprising a rotatable vessel, driving mechanism for rotating said vessel, a main driving shaft, means including a clutch member for causing said main driving shaft to actuate said driving mechanism in either direction, a rod mounted independently of said main driving shaft for shifting said clutch member, a lever connected to said rod, a cam actuated by said main driving shaft to operate said lever and thereby periodically reverse said clutch member, and means operative to disconnect said lever from said cam for rendering the latter inoperative to move said rod.

18. The driving mechanism for a washing machine comprising a rotatable vessel, driving mechanism for rotating said vessel, a main driving shaft, means including a clutch member for causing said main driving shaft to actuate said driving mechanism in either direction, a rod for shifting said clutch member, a lever connected to said rod, a cam actuated by said main driving shaft to operate said lever and thereby periodically reverse said clutch member, means operative to disconnect said lever from said cam for rendering the latter inoperative to move said rod, and means actuated by the movement of said lever to inoperative position for actuating said rod to move said clutch member to neutral position.

19. The combination in a washing machine of a rotatable vessel, driving mechanism for rotating said vessel, a main driving shaft, means including a clutch member for causing said main driving shaft to actuate said driving mechanism in either direction, a rod for shifting said clutch member, a lever connected to said rod, a cam actuated by said main driving shaft to operate said lever and thereby periodically reverse said clutch member, means for moving said lever from its normal operative position for rendering it inoperative to move said rod, means actuated by the movement of said lever to inoperative position for actuating said rod to move said clutch member to neutral position, auxiliary driving means connectible to and operable by said main driving shaft, means for causing the actuation of said driving mechanism by said auxiliary driving means, and means for preventing the operation of said last named means unless said lever operating means is in a position corresponding to the inoperative position of said lever.

20. The combination in a washing machine of a rotatable vessel, driving mechanism for rotating said vessel, a main driving shaft, means including a clutch member for causing said main driving shaft to actuate said driving mechanism in either direction, a rod for shifting said clutch member, a lever connected to said rod, a cam actuated by said main driving shaft to operate said lever and thereby periodically reverse said clutch member, means, including an arm, for moving said lever from its normal operative position for rendering it inoperative to move said rod, means actuated by the movement of said lever to inoperative position for actuating said rod to move said clutch member to neutral position, auxiliary driving means connectible to and operable by said main driving shaft, means for causing the actuation of said driving mechanism by said auxiliary driving means, said arm having an aperture therein, and a bolt operated by said last named means to engage said aperture only when said lever is in inoperative position.

JOHN T. HUME.